US012267151B2

(12) United States Patent
Tanabe et al.

(10) Patent No.: US 12,267,151 B2
(45) Date of Patent: Apr. 1, 2025

(54) COMMUNICATION NETWORK TERMINATING DEVICE, COMMUNICATION SYSTEM, SIGNAL JAMMING METHOD AND SIGNAL JAMMING PROGRAM

(71) Applicant: NIPPON TELEGRAPH AND TELEPHONE CORPORATION, Tokyo (JP)

(72) Inventors: Akihiro Tanabe, Musashino (JP); Toshiaki Shitaba, Musashino (JP); Takashi Mitsui, Musashino (JP); Tomoaki Yoshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 165 days.

(21) Appl. No.: 18/012,076

(22) PCT Filed: Jul. 2, 2020

(86) PCT No.: PCT/JP2020/026011
§ 371 (c)(1),
(2) Date: Dec. 21, 2022

(87) PCT Pub. No.: WO2022/003898
PCT Pub. Date: Jan. 6, 2022

(65) Prior Publication Data
US 2023/0254060 A1 Aug. 10, 2023

(51) Int. Cl.
*H04J 14/00* (2006.01)
*H04J 14/02* (2006.01)
(Continued)

(52) U.S. Cl.
CPC .......... *H04J 14/0298* (2013.01); *H04B 10/25* (2013.01); *H04B 10/25751* (2013.01);
(Continued)

(58) Field of Classification Search
CPC ...... H04J 14/0298; H04J 14/0305; H04J 1/02; H04J 14/00; H04B 10/25751; H04B 10/25; H04K 3/00; H04N 7/166
(Continued)

(56) References Cited

U.S. PATENT DOCUMENTS 4,434,436 A * 2/1984 Kleykamp ............. H04N 7/167
348/E7.055
4,450,481 A * 5/1984 Dickinson ............. H04N 7/173
348/E7.075
(Continued)

FOREIGN PATENT DOCUMENTS

| JP | S62-254585 A | 11/1987 |
| JP | H10-013354 A | 1/1998 |
| JP | 2016-152539 A | 8/2016 |

OTHER PUBLICATIONS

"Transmission equipment for multi-channel television signals over optical access networks by sub-carrier multiplexing (SCM)", ITU-T Rec. J.186, 2008.
(Continued)

*Primary Examiner* — Dibson J Sanchez

(57) ABSTRACT

An apparatus includes a reception processing unit configured to output a frequency division multiplexed signal obtained from a transmission signal transmitted over the wired communication network, an output control unit configured to output, in a case that apparatus identifying data matches signal specifying data, a frequency band specifying data indicating a frequency band corresponding to the signal specifying data, the apparatus identifying data being for requesting signal quality degradation, and the signal specifying data specifying a carrier signal requesting signal quality degradation among a plurality of carrier signals included in the frequency division multiplexed signal, a disturbing signal generation unit configured to generate a
(Continued)

disturbing signal in a frequency band corresponding to the frequency band specifying data output by the output control unit, and a multiplexing unit configured to multiplex the frequency division multiplexed signal and the disturbing signal to output.

6 Claims, 11 Drawing Sheets

(51) Int. Cl.
  *H04B 10/25* (2013.01)
  *H04B 10/2575* (2013.01)
  *H04K 3/00* (2006.01)
  *H04N 7/16* (2011.01)
(52) U.S. Cl.
  CPC ............... *H04J 14/00* (2013.01); *H04K 3/00* (2013.01); *H04N 7/166* (2013.01)
(58) Field of Classification Search
  USPC .............................. 398/39, 43–103, 140–172
  See application file for complete search history.

(56) References Cited

U.S. PATENT DOCUMENTS

| | | | | | |
|---|---|---|---|---|---|
| 4,769,838 | A | * | 9/1988 | Hasegawa | H04K 3/825 725/144 |
| 5,140,633 | A | * | 8/1992 | Gurusami | H04K 3/825 455/26.1 |
| 5,278,908 | A | * | 1/1994 | Parikh | H04K 3/825 380/209 |
| 5,355,410 | A | * | 10/1994 | Blais | H04K 3/825 380/209 |
| 5,361,301 | A | * | 11/1994 | Robertson | H04K 3/42 725/31 |
| 5,682,426 | A | * | 10/1997 | Miliani | H04N 7/171 348/E7.066 |
| 5,729,281 | A | * | 3/1998 | Utsumi | H04H 60/90 725/123 |
| 6,104,814 | A | * | 8/2000 | Soderqvist | H04K 3/41 348/E7.065 |
| 6,310,957 | B1 | * | 10/2001 | Heller | H04N 21/4396 348/E7.075 |
| 2009/0061759 | A1 | * | 3/2009 | Stoddard | H04K 3/41 455/1 |
| 2012/0196525 | A1 | * | 8/2012 | Stiscia | H04K 3/42 455/1 |

OTHER PUBLICATIONS

"Transmission equipment for transferring multi-channel television signals over optical access networks by frequency modulation conversion", ITU-T Rec. J.185, 2012.

"The Institute of Electronics, Information and Communication Engineers Knowledge Base, Group 5 Communications and Broadcasting, Part 8 Broadcasting and CATV, Chapter 3 Digital Broadcasting Services, 3-1-3 Limited Reception System, 2012", pp. 8-10, [retrieved Jun. 15, 2020], internet [URL:http://www.ieicehbkb.org/files/05/05gun_08hen_03.pdf].

* cited by examiner

| APPARATUS IDENTIFYING DATA | 000002 /261 | |
|---|---|---|
| SIGNAL SPECIFYING DATA | FREQUENCY BAND SPECIFYING DATA | |
| | CENTER FREQUENCY (MHz) | FREQUENCY BANDWIDTH (MHz) |
| Ch001 | 400 | 5.5 |
| Ch002 | 406 | 7.5 |
| Ch003 | 414 | 5.5 |
| ⋮ | ⋮ | ⋮ |

Fig. 2

COMMUNICATION NETWORK TERMINATING DEVICE, COMMUNICATION SYSTEM, SIGNAL JAMMING METHOD AND SIGNAL JAMMING PROGRAM

CROSS-REFERENCE TO RELATED APPLICATIONS

This application is a 371 U.S. National Phase of International Application No. PCT/JP2020/026011, filed on Jul. 2, 2020. The entire disclosure of the above application is incorporated herein by reference.

TECHNICAL FIELD

The present disclosure relates to a communication network termination apparatus, a communication system, a signal disturbing method, and a signal disturbing program.

BACKGROUND ART

In a case that a signal of a video or the like is transmitted using a frequency division multiplexing scheme (hereinafter, also referred to as an "FDM scheme"), each frequency band is assigned with an individual service defined in a certain service category. For example, for a service category of a television broadcast, a "channel" is defined as an individual service, so each frequency band is assigned with a "channel".

To view a video, a user installs a television receiver (hereinafter, referred to as a "receiver") that can receive frequency division multiplexed signals in which video signals are frequency division multiplexed to select a channel. The user selects a channel to use by using an input device such as a remote controller for the installed receiver. The receiver receives channel identifying data indicating the selected channel from the input device, and then, extracts signals of a frequency band corresponding to the received channel identifying data from the frequency division multiplexed signals that are received. The receiver performs processing such as demodulation on the extracted signals to restore the video signals. The receiver displays the video on a display screen of the receiver in accordance with the restored video signals.

Note that the above scheme is an example for electrical signals, but a case of optical signals is called a wavelength division multiplexing scheme instead of the frequency division multiplexing scheme because each signal is managed using a wavelength, that is an inverse of a frequency.

By the way, the television broadcast may be performed using radio waves propagating in air, using wired electric lines as in a Common Antenna Television (CATV), or using optical lines as in communication systems adopting an intensity modulation scheme defined in NPL 1 and an FM conversion scheme defined in NPL 2.

Here, an overview of a communication system 100 adopting the FM conversion scheme will be described with reference to FIG. 9. Note that in FIG. 9, a solid connection line indicates an electrical line connected by an electrical wiring line, and a dotted connection line indicates an optical line connected by an optical fiber, for example.

Video head end devices 101-1 to 101-3, to which different center frequencies are previously allocated, modulate carrier waves at the allocated center frequencies in accordance with respective video signals to generate carrier signals having frequency bands that do not overlap each other. Hereinafter, the carrier signal obtained from the video signal is referred to as a video carrier signal. Assume that the frequency bands of the video carrier signals generated by the video head end devices 101-1 to 101-3 are previously assigned with the channel identifying data "Ch001," "Ch002," and "Ch003", respectively.

A multiplexer 102 multiplexes the video carrier signals generated and transmitted by the respective video head end devices 101-1 to 101-3. The multiplexer 102 outputs a frequency division multiplexed signal obtained by the multiplexing of the signals. A graph of a supplementary diagram denoted by a reference sign 401 indicates characteristics of the frequency division multiplexed signal output by the multiplexer 102, where a horizontal axis represents a frequency and a vertical axis represents power. The frequency bands of the video carrier signals transmitted by the video head end devices 101-1 to 101-3 are made to not overlap each other in advance as described above. This allows a state in a frequency domain, as illustrated in the supplementary diagram denoted by the reference sign 401, where the video carrier signals respectively corresponding to "Ch001," "Ch002," and "Ch003" do not overlap each other.

A transmitter 103 performs frequency modulation (FM) conversion on the frequency division multiplexed signal output by the multiplexer 102 to generate an FM conversion signal which is a wideband FM signal. The transmitter 103 converts the generated FM conversion signal into an optical signal. The transmitter 103 amplifies the converted optical signal to transmit to a transmission apparatus 105 via a relay communication network 104.

The transmission apparatus 105, which is a Video-Optical Line Terminal (V-OLT) defined in NPL 2, accommodates communication network termination apparatuses 201-1 to 201-N as a plurality of Video-Optical Network Units (V-ONUs) via a light splitter 200. Note that the V-ONU corresponds to a Video-Optical Network Terminal (V-ONT) in NPL 2. The light splitter 200 splits the optical signal of the FM conversion signal transmitted by the transmission apparatus 105 into N. The light splitter 200 sends N split optical signals to optical lines connecting to the communication network termination apparatuses 201-1 to 201-N, respectively. Here, N represents an integer of 1 or more, and a branch number "i" of reference signs of the communication network termination apparatus 201-i and the receiver 202-i illustrated in FIG. 9 is any integer value in a range of 1 to N.

Each of the communication network termination apparatuses 201-1 to 201-N receives the optical signal split by the light splitter 200 through the optical line, and then, converts the received optical signal into an electrical signal to obtain the FM conversion signal. Each of the communication network termination apparatuses 201-1 to 201-N performs FM demodulation on the FM conversion signal to restore the frequency division multiplexed signal. The communication network termination apparatuses 201-1 to 201-N output the restored frequency division multiplexed signals to the receivers 202-1 to 202-N connected thereto, respectively.

Note that a graph of a supplementary diagram denoted by a reference sign 402 illustrates characteristics of the frequency division multiplexed signal that is restored and output by any one communication network termination apparatus 201-i among the communication network termination apparatuses 201-1 to 201-N, as an example, where a horizontal axis represents a frequency, and a vertical axis is power. All communication network termination apparatuses 201-1 to 201-N output the video carrier signals having power of substantially the same level to the receivers 202-1 to 202-N connected thereto, respectively, although the power may have level differences per frequency band.

This allows each of users of the receivers 202-1 to 202-N to select any one channel of "Ch001," "Ch002," and "Ch003" by an input device such as a remote controller to display a video corresponding to the selected channel on the display screen of the receivers 202-1 to 202-N, respectively.

CITATION LIST

Non Patent Literature

NPL 1: "Transmission equipment for multi-channel television signals over optical access networks by sub-carrier multiplexing (SCM)," ITU-T Rec. J.186, 2008
NPL 2: "Transmission equipment for transferring multi-channel television signals over optical access networks by frequency modulation conversion," ITU-T Rec. J.185, 2012
NPL 3: The Institute of Electronics, Information and Communication Engineers, Knowledge Base, Group 5 Communication/Broadcast, Edition 8 Broadcast/CATV, Chapter 3 Digital Broadcast Services, 3-1-3 Restriction Communication Scheme, pp. 8-10, [searched on Jun. 15, 2020], Internet (URL:http://www.ieice-hbkb.org/files/05/05gun_08hen_03.pdf)

SUMMARY OF THE INVENTION

Technical Problem

Here, in a broadcast service, there may be an out-of-area retransmission channel or a community-dedicated channel. The reason why such a channel can be added is that in a frequency band used in a certain service area, a signal of part of the frequency band can be transmitted from a different transmission location, or the signal of part of the frequency band can be inserted in the middle of the transmission.

However, in a case of attempting to add the out-of-area retransmission channel, the community-dedicated channel, or the like in the communication system 100 adopting the FM conversion scheme illustrated in FIG. 9, a problem described below may be caused.

For example, FIG. 10 is a diagram illustrating a configuration in which the communication network termination apparatuses 201-1 to 201-N and the receivers 202-1 to 202-N respectively connected to the communication network termination apparatuses 201-1 to 201-N in the communication system 100 adopting the FM conversion scheme illustrated in FIG. 9 are divided into two (N/2) and are installed for two service areas, areas A and B. Note that, in FIG. 10, N represents an even number of 2 or more.

Here, assume that the out-of-area retransmission channel, the community-dedicated channel, or the like is the channel "Ch003" transmitted by the video head end device 101-3. Assume that, in the configuration illustrated in FIG. 10, viewing of the video of "Ch003" is permitted for the receivers 202-1 to 202-N/2 in the area A, and viewing of the video of "Ch003" is restricted for the receivers 202-(N/2+1) to 202-N in the area B.

As described above, in the case of the communication system 100, the frequency multiplexed division signal is transmitted using the FM conversion scheme. For this reason, the video head end device 101-3 transmitting the video signal of "Ch003" is required to connect to the transmitter 103 via the multiplexer 102. Therefore, it may be difficult to insert the video signal of "Ch003" later for the area A in the middle of a path from the transmitter 103 to the transmission apparatus 105, unlike a television broadcast utilizing radio waves.

To solve this problem, there is a technique for constructing a communication system 100A for the area A and a communication system 100B for the area B, as illustrated in FIG. 11, for example. Note that in FIG. 11, video head end devices 101A-1 and 101B-1 have the same configuration as the video head end device 101-1 in FIG. 9, and video head end devices 101A-2 and 101B-2 have the same configuration as the video head end device 101-2 in FIG. 9. A video head end device 101A-3 has the same configuration as the video head end device 101-3 in FIG. 9.

Multiplexers 102A and 102B, transmitters 103A and 103B, relay communication networks 104A and 104B, transmission apparatuses 105A and 105B, and light splitters 200A and 200B are the same configuration as the multiplexer 102, the transmitter 103, the relay communication network 104, the transmission apparatus 105, and light splitter 200 in FIG. 9, respectively.

As illustrated in FIG. 11, in the area A, because viewing of the video of "Ch001," "Ch002," and "Ch003" is permitted, the communication system 100A is configured to include the video head end devices 101A-1, 101A-2, and 101A-3. In contrast, in the area B, because viewing of the video of "Ch001" and "Ch002" is permitted although viewing of the video of "Ch003" is restricted, the communication system 100B is configured to include the video head end devices 101A-1 and 101A-2, but not include the video head end device 101A-3. With these configurations, in the area B, the video signal of "Ch003" is not transmitted, and thus, the receivers 202-(N/2+1) to 202-N in the area B can be made to not display the video of the "Ch003".

However, in the configuration illustrated in FIG. 11, the same frequency band is used for the video signals of "Ch001" and "Ch002" in both the areas A and B. Nevertheless, in the configuration illustrated in FIG. 11, the communication systems 100A and 100B are required to be constructed for the areas A and B, respectively, which is inefficient and brings about a problem of increasing in the cost required to construct the system.

It is possible to use, without constructing the different communication systems 100A and 100B as illustrated in FIG. 11, an encryption technique in the configuration illustrated in FIG. 10 in which the video signal of "Ch003" is encrypted and transmitted such that the receivers 202-1 to 202-N/2 in the area A can decode the encrypted video signal of "Ch003" and the receivers 202-(N/2+1) to 202-N in the area B cannot decode the encrypted video signal of "Ch003" to perform restriction of viewing.

For example, in the television broadcast, examples of a mechanism for using the above-mentioned encryption technique include a mechanism for restricting viewing by a restriction reception system called a Conditional Access System (CAS) (see, NPL 3, for example). However, in a case of using the restriction reception system, it is necessary to manage users subscribing to the service. For this reason, in free broadcasting that is not pay broadcasting, newly performing such management increases the cost required for operation, and a risk of the code being decrypted and invalidated remains problematically.

In view of the above circumstances, the present invention has an object to provide a technique capable of restricting reproduction of a specific signal in an individual receiver at a low cost and without a risk of a code being decrypted and invalidated, in a case of transmitting a plurality of signals using a frequency division multiplexing scheme through a wired communication network.

Means for Solving the Problem

An aspect of the present invention is a communication network termination apparatus including: a reception processing unit connected to a wired communication network, and configured to output a frequency division multiplexed signal obtained from a transmission signal transmitted over the wired communication network; an output control unit configured to output, in a case that apparatus identifying data matches signal specifying data, a frequency band specifying data indicating a frequency band corresponding to the signal specifying data, the apparatus identifying data being for requesting signal quality degradation, and the signal specifying data specifying a carrier signal requesting signal quality degradation among a plurality of carrier signals included in the frequency division multiplexed signal; a disturbing signal generation unit configured to generate a disturbing signal in a frequency band corresponding to the frequency band specifying data output by the output control unit; and a multiplexing unit configured to multiplex the frequency division multiplexed signal and the disturbing signal to output.

An aspect of the present invention is a communication system including: a transmitter configured to send a transmission signal generated in accordance with a frequency division multiplexed signal to a wired communication network; a receiver configured to receive the frequency division multiplexed signal, and select and demodulate a carrier signal included in the frequency division multiplexed signal; a communication network termination apparatus connecting to the wired communication network and the receiver; and a control server apparatus configured to transmit apparatus identifying data and signal specifying data to the communication network termination apparatus, the apparatus identifying data specifying an apparatus to be requested to perform signal quality degradation, the signal specifying data specifying a signal requesting signal quality degradation among a plurality of carrier signals included in the frequency division multiplexed signal, wherein the communication network termination apparatus includes a reception processing unit configured to output the frequency division multiplexed signal obtained from the transmission signal transmitted over the wired communication network, an output control unit configured to output, in a case that the apparatus identifying data transmitted by the control server apparatus matches the signal specifying data, frequency band specifying data indicating a frequency band corresponding to the signal specifying data, a disturbing signal generation unit configured to generate a disturbing signal in a frequency band corresponding to the frequency band specifying data output by the output control unit, and a multiplexing unit configured to multiplex the frequency division multiplexed signal and the disturbing signal to output.

An aspect of the present invention is a signal disturbing method including: a first outputting step of outputting a frequency division multiplexed signal obtained from a transmission signal transmitted over a wired communication network; a second outputting step of outputting, in a case that apparatus identifying data matches signal specifying data, a frequency band specifying data indicating a frequency band corresponding to the signal specifying data, the apparatus identifying data being for requesting signal quality degradation, and the signal specifying data specifying a carrier signal requesting signal quality degradation among a plurality of carrier signals included in the frequency division multiplexed signal; a generating step of generating a disturbing signal in a frequency band corresponding to the frequency band specifying data output in the second outputting step; and a third outputting step of multiplexing the frequency division multiplexed signal and the disturbing signal to output.

An aspect of the present invention is a signal disturbing program for causing a computer included, in place of the output control apparatus, in the communication network termination apparatus described above to function as: an output control means for outputting, in a case that the apparatus identifying data matches signal specifying data, a frequency band specifying data indicating a frequency band corresponding to the signal specifying data, the apparatus identifying data being for requesting signal quality degradation, and the signal specifying data specifying a carrier signal requesting signal quality degradation among a plurality of carrier signals included in the frequency division multiplexed signal.

Effects of the Invention

According to the present invention, it is possible to restrict reproduction of a specific signal in an individual receiver at a low cost and without a risk of a code being decrypted and invalidated, in a case of transmitting a plurality of signals using a frequency division multiplexing scheme through a wired communication network.

BRIEF DESCRIPTION OF DRAWINGS

FIG. 2 is a diagram illustrating a data configuration of a frequency band specifying table stored in a storage unit of a communication network termination apparatus according to the first embodiment.

DESCRIPTION OF EMBODIMENTS

First Embodiment

Figure 1:
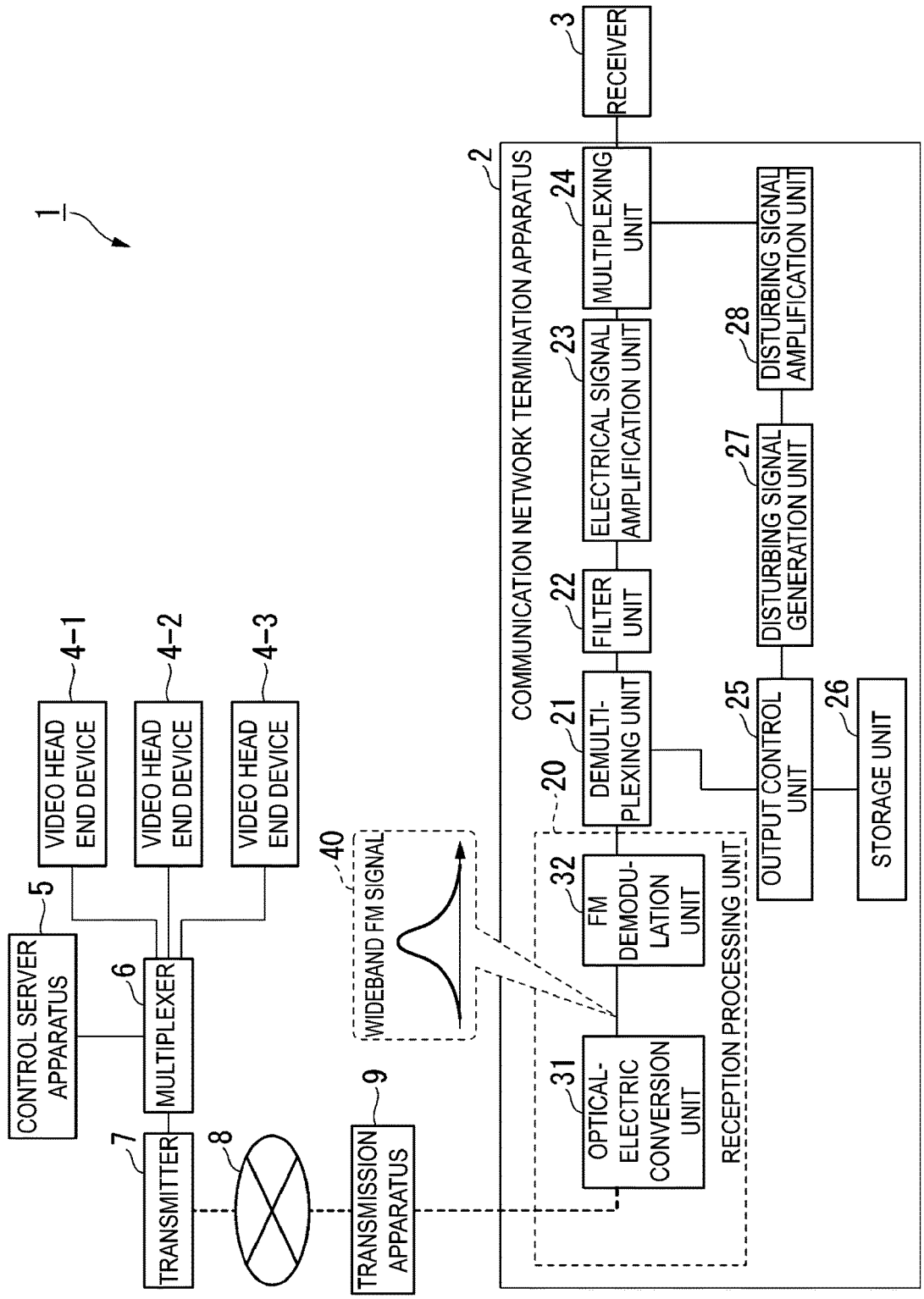
FIG. 1 is a block diagram illustrating a configuration of a communication system according to a first embodiment.

Hereinafter, embodiments of the present invention will be described with reference to the drawings. FIG. 1 is a block diagram illustrating a configuration of a communication system 1 according to a first embodiment. The communication system 1 includes video head end devices 4-1, 4-2, and 4-3, a control server apparatus 5, a multiplexer 6, a transmitter 7, a relay communication network 8, a transmission apparatus 9, a communication network termination apparatus 2, and a receiver 3. Note that in FIG. 1, a solid connection line indicates an electrical line connected by an electrical wiring line, and a dotted connection line indicates an optical line connected by an optical fiber, for example.

The video head end devices 4-1 to 4-3, to which different respective center frequencies are previously allocated, modulate carrier waves at the allocated center frequencies in accordance with respective video signals to generate video carrier signals having frequency bands that do not overlap each other. Examples of a modulation scheme adopted for modulation include 64 Quadrature Amplitude Modulation (QAM). The video signal may be previously stored in an internal storage area of each of the video head end devices 4-1 to 4-3, or may be given from the outside.

The frequency bands of the video carrier signals generated by the video head end devices 4-1 to 4-3 are previously assigned with channel identifying data "Ch001," "Ch002," and "Ch003", respectively. Note that the number of channels is not limited to three, and may be any number. However, the communication system 1 needs to include video head end devices 4-1 to 4-3 so that the number of video head end devices matches the number of channels.

The control server apparatus 5 receives an operation of an administrator of the communication system 1 to perform processing for designating the receiver 3 for performing restriction of viewing, and a video subjected to restriction of viewing. Here, performing the restriction of viewing is to degrade a signal quality of the video carrier signal corresponding to the designated video to cause a state where the designated receiver 3 cannot correctly demodulate the video carrier signal, and so, cannot display a normal video on a display screen. The state where the normal video cannot be displayed on the display screen is, for example, a state where a video including noise and the like is displayed on the display screen, or a state where a video is not displayed on the display screen.

Specifically, the administrator of the communication system 1, in the control server apparatus 5, performs an input operation for inputting apparatus identifying data and signal specifying data, the apparatus identifying data being previously assigned to the communication network termination apparatus 2 connecting to the receiver 3 for performing the restriction of viewing, the signal specifying data specifying a frequency band of a video carrier signal corresponding to the video subjected to the restriction of viewing. Here, the signal specifying data is the channel identifying data described above, for example.

Note that it is assumed that the administrator of the communication system 1 knows the apparatus identifying data previously assigned to the communication network termination apparatus 2, and the all channel identifying data previously assigned to the frequency bands used by the service provided in the communication system 1.

The control server apparatus 5 generates a control signal including the apparatus identifying data and signal specifying data taken in by the input operation of the administrator. A center frequency different from center frequencies allocated to the respective video head end devices 4-1 to 4-3 is previously allocated to the control server apparatus 5. The control server apparatus 5 modulates a carrier wave with the allocated center frequency in accordance with the control signal to generate a control carrier signal in a frequency band that does not overlap frequency bands of the video carrier signals output by the video head end devices 4-1 to 4-3.

The multiplexer 6 multiplexes the video carrier signals generated and transmitted by the video head end devices 4-1 to 4-3, and the control carrier signal generated and transmitted by the control server apparatus 5. The multiplexer 6 outputs frequency division multiplexed signals obtained by the multiplexing of the signals.

The transmitter 7, which includes therein an FM modulator, a light source, a light modulator, and a light amplifier, performs FM conversion on the frequency division multiplexed signals output by the multiplexer 6 using the FM modulator to generate the FM conversion signal which is a wideband FM signal. The transmitter 7 performs light intensity modulation by using a light modulator on light from the light source by using the FM conversion signal to generate an optical signal of the FM conversion signal. The transmitter 7 amplifies the optical signal using the light amplifier. The transmitter 7 sends the amplified optical signal to the relay communication network 8.

The relay communication network 8, which includes a plurality of transmission apparatuses, is a multi-stage transmission optical communication network that relays video signals by multi-stage transmission apparatuses. The relay communication network 8 is a non-IP (Internet Protocol) network, for example. The relay communication network 8 transmits a transmission signal, which is the optical signal of the FM conversion signal sent by the transmitter 7, to the transmission apparatus 9.

The transmission apparatus 9 amplifies the transmission signal transmitted by the relay communication network 8 to transmit to the communication network termination apparatus 2. Note that in the first embodiment, the transmission apparatus 9 is a V-OLT defined in NPL 2.

The communication network termination apparatus 2 includes a reception processing unit (reception processor) 20, a demultiplexing unit 21, a filter unit 22, an electrical signal amplification unit 23, a multiplexing unit (multiplexer) 24, an output control unit (output controller) 25, a storage unit (storage) 26, a disturbing signal generation unit (disturbing signal generator) 27, and a disturbing signal amplification unit 28. Note that, in the communication network termination apparatus 2, function units of the reception processing unit 20, the filter unit 22, and the electrical signal amplification unit 23 have the same configurations as the function units included in the V-ONU.

The reception processing unit 20 includes an optical-electric conversion unit 31 and an FM demodulation unit 32. The optical-electric conversion unit 31 is, for example, a Receiver Optical Sub-Assembly (ROSA), and receives the transmission signal transmitted by the transmission apparatus 9. The received transmission signal is the optical signal of the FM conversion signal, which has been modulated by the light intensity modulation, and thus, the optical-electric conversion unit 31 extracts, by direct detection, for example, an electrical signal of the FM conversion signal that is the wideband FM signal illustrated in a supplementary diagram denoted by a reference sign 40. Note that in the graph of the supplementary diagram denoted by the reference sign 40, a horizontal axis represents a frequency and a vertical axis represents power.

The FM demodulation unit 32 performs FM demodulation on the FM conversion signal to restore the frequency division multiplexed signal. The FM demodulation unit 32 outputs the restored frequency division multiplexed signal. The demultiplexing unit 21 demultiplexes to obtain a frequency band of the control carrier signal from the frequency division multiplexed signal output by the FM demodulation unit 32. The demultiplexing unit 21 outputs the demultiplexed control carrier signal to the output control unit 25, and outputs the frequency division multiplexed signal from which the control carrier signal is separated to the filter unit 22.

The filter unit 22 removes a signal in the frequency band including a noise signal from the frequency division multiplexed signal output by the demultiplexing unit 21. The electrical signal amplification unit 23 amplifies the frequency division multiplexed signal from which the noise signal is removed by the filter unit 22.

The storage unit 26 previously stores a frequency band specifying table 261 illustrated in FIG. 2. The frequency band specifying table 261 includes items of "apparatus identifying data," "signal specifying data," and "frequency band specifying data". Written to the item "apparatus identifying data" is the apparatus identifying data previously assigned to the communication network termination apparatus 2. Note that in a case that a plurality of communication network termination apparatuses 2 are present, the communication network termination apparatuses 2 are previously assigned with different apparatus identifying data so that the individual communication network termination apparatuses 2 can be identified. As the apparatus identifying data, for example, the ONU-ID (Identifier) assigned to each of the V-ONUs may be adopted.

Written to the item "signal specifying data" is the channel identifying data. The item "frequency band specifying data" includes sub-items of "center frequency" and "frequency bandwidth". Written to the items "center frequency" and "frequency bandwidth" are values indicating the center frequency and the frequency bandwidth in [MHz], respectively, of the channel indicated by the channel identifying data written to the item of the corresponding "signal specifying data". Note that the values of the center frequency and the frequency bandwidth illustrated in FIG. 2 are examples, and are values defined as appropriate for each service provided.

The output control unit 25 demodulates the control carrier signal demultiplexed by the demultiplexing unit 21 to restore the control signal. The output control unit 25 reads out the apparatus identifying data and the signal specifying data included in the restored control signal. The output control unit 25 determines whether or not the read apparatus identifying data matches the apparatus identifying data of the item "apparatus identifying data" in the frequency band specifying table 261 in the storage unit 26.

In a case that those two apparatus identifying data pieces match, the output control unit 25 refers to the frequency band specifying table 261 to detect the frequency band specifying data corresponding to the read signal specifying data, that is, the center frequency and the frequency bandwidth written to the items "center frequency" and "frequency bandwidth", respectively.

The disturbing signal generation unit 27 generates a disturbing signal for degrading a signal quality in accordance with the center frequency and frequency bandwidth detected by the output control unit 25. The disturbing signal amplification unit 28 amplifies the disturbing signal generated by the disturbing signal generation unit 27. The multiplexing unit 24 multiplexes the frequency division multiplexed signal amplified by the electrical signal amplification unit 23 and the disturbing signal amplified by the disturbing signal amplification unit 28. The multiplexing unit 24 transmits the frequency multiplexed division signal on which the disturbing signal obtained by the multiplexing is superimposed to the receiver 3.

The receiver 3, which is a television receiver, for example, receives the frequency multiplexed division signal on which the disturbing signal output by the multiplexing unit 24 in the communication network termination apparatus 2 is superimposed. When the user operates an input device such as a remote controller to select a channel, the input device transmits the channel identifying data indicating the selected channel to the receiver 3. The receiver 3, on receiving the channel identifying data, extracts the video carrier signal included in the frequency band corresponding to the channel indicated by the received channel identifying data from the frequency division multiplexed signal on which the disturbing signal is superimposed. The receiver 3 performs processing such as demodulation on the extracted video carrier signal to restore the video signal. The receiver 3 displays the video on the display screen in accordance with the restored video signal.

Processing by Communication System according to First Embodiment

Figure 3:
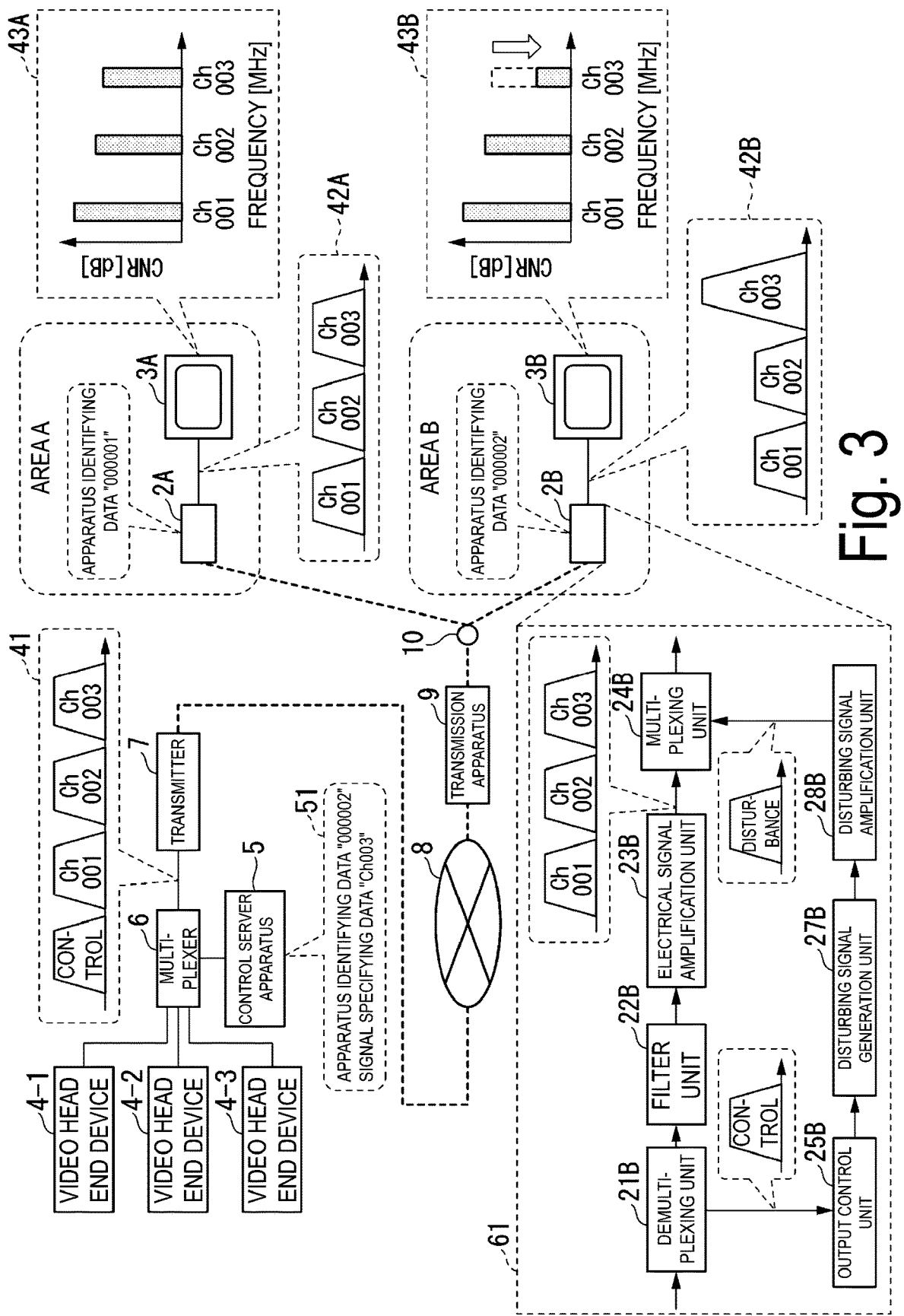
FIG. 3 is a diagram illustrating processing performed by the communication system according to the first embodiment.
Figure 4:
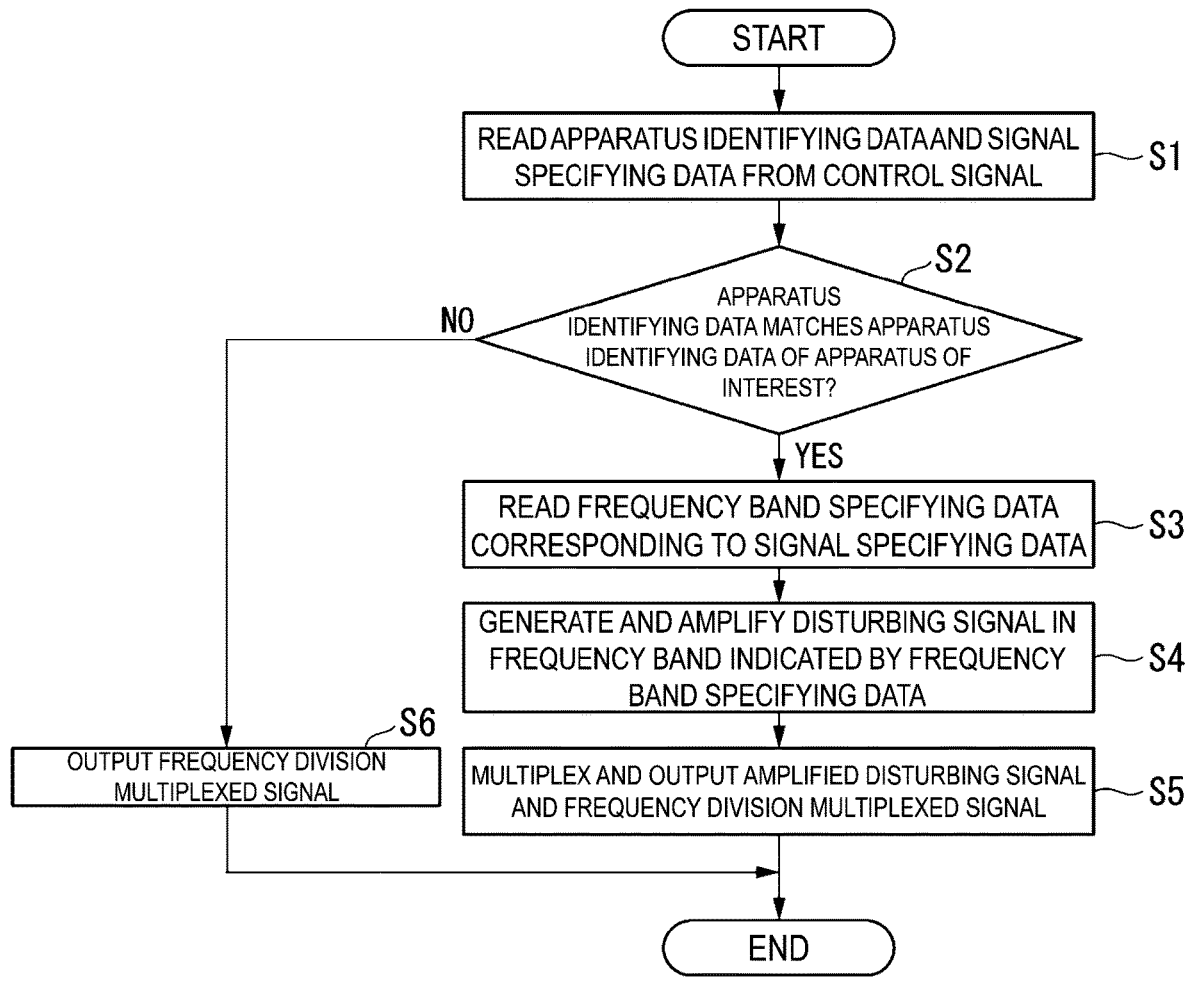
FIG. 4 is a flowchart illustrating a flow of processing performed by the communication network termination apparatus according to the first embodiment.

Next, the processing by the communication system 1 according to the first embodiment will be described with reference to FIGS. 3 and 4. FIG. 3 is a diagram illustrating an overview of the processing by the communication system 1. Here, as illustrated in FIG. 3, the communication system 1 includes a communication network termination apparatus 2A and a receiver 3A in the area A, and a communication network termination apparatus 2B and a receiver 3B in the area B.

In this configuration, for the receiver 3A installed in the area A, permitted is viewing of the video of all the channel identifying data "Ch001," "Ch002," and "Ch003" transmitted by the video head end devices 4-1 to 4-3, respectively. In contrast, the processing is performed such that, for the receiver 3B installed in the area B, permitted is viewing of the video of the channel identifying data "Ch001" and "Ch002" among the channel identifying data "Ch001," "Ch002," and "Ch003" transmitted by the video head end devices 4-1 to 4-3, but restricted is viewing of the video of the channel identifying data "Ch003".

Before describing the processing, details of the configuration illustrated in FIG. 3 will be described. Note that the same components in FIG. 3 as those in FIG. 1 are denoted by the same reference signs, and similarly to FIG. 1, a solid connection line indicates an electrical line connected by an electrical wiring line, and a dotted connection line indicates an optical line connected by an optical fiber, for example. Each of the communication network termination apparatuses 2A and 2B is connected to the transmission apparatus 9 via a light splitter 10.

The receivers 3A and 3B have the same configuration as the receiver 3 illustrated in FIG. 1. The communication network termination apparatuses 2A and 2B have the same configuration as the communication network termination apparatus 2 illustrated in FIG. 1, and hereinafter, each of function units of the communication network termination apparatus 2A respectively corresponding to the function units included in the communication network termination apparatus 2 is indicated by being denoted by a reference sign of the function part suffixed with "A". Each of function units of the communication network termination apparatus 2B corresponding to the function units included in the communication network termination apparatus 2 is indicated by being denoted by a reference sign of the function part suffixed with "B".

The communication network termination apparatus 2A is previously assigned with the apparatus identifying data "000001", and the communication network termination apparatus 2B is previously assigned with the apparatus identifying data "000002". Therefore, written to the item "apparatus identifying data" in a frequency band specifying table 261A stored in a storage unit 26A of the communication network termination apparatus 2A is "000001", and written to the item "apparatus identifying data" in a frequency band specifying table 261B stored in a storage unit 26B of the communication network termination apparatus 2B is "000002".

Note that the apparatus identifying data pieces of the items "apparatus identifying data" in the respective frequency band specifying tables 261A and 261B are previously written to the communication network termination apparatuses 2A and 2B directly, or before operation of the communication network termination apparatuses 2A and 2B from a management device connected via a communication line for management, for example.

In contrast, the data pieces of the items "signal specifying data" and "frequency band specifying data" in the respective frequency band specification tables 261A and 261B are updated, i.e., newly written or rewritten in a case that a video head end device different from the video head end devices 4-1 to 4-3 is newly installed to start a service, or in a case that the channel identifying data is renewed.

In the case of updating the data pieces of the items "signal specifying data" and "frequency band specifying data", the control server apparatus 5 transmits update data with being included in the control signal, the update data including a combination of the signal specifying data and the frequency band specifying data, for example. Output control units 25A and 25B of the communication network termination apparatuses 2A and 2B demodulate the control carrier signals demultiplexed by demultiplexing units 21A and 21B to restore the control signals, respectively. In a case that the restored control signals include the update data, the output control units 25A and 25B of the communication network termination apparatuses 2A and 2B update the items "signal specifying data" and "frequency band specifying data" in the frequency band specifying tables 261A and 261B in accordance with the update data included in the control signals.

Here, the frequency bands of the video carrier signals generated by three video head end devices 4-1 to 4-3 are assigned with channel identifying data "Ch001," "Ch002," and "Ch003", respectively. As such, assume that written to the items "signal specifying data" and "frequency band specifying data" in the frequency band specifying tables 261A and 261B are record values corresponding to the items of "signal specifying data" of "Ch001," "Ch002," and "Ch003" illustrated in FIG. 2. Specifically, the frequency band specifying tables 261A and 261B are different from each other only in the value of the item "apparatus identifying data", and are same as each other in the values of the items "signal specifying data" and "frequency band specifying data".

Hereinafter, a flow of the processing will be described with reference to FIG. 3. The video head end devices 4-1 to 4-3 modulate the carrier waves at the respective center frequencies allocated thereto in accordance with the video signals to generate the video carrier signals. The administrator of the control server apparatus 5, as illustrated in a supplementary diagram denoted by a reference sign 51, in the control server apparatus 5, performs an input operation for inputting the apparatus identifying data "000002" and the signal specifying data "Ch003", the apparatus identifying data "000002" corresponding to the communication network termination apparatus 2B connecting to the receiver 3B installed in the area B for performing the restriction of viewing, the signal specifying data "Ch003" specifying the video subjected to the restriction of viewing.

The control server apparatus 5 generates a control signal including the apparatus identifying data "000002" and signal specifying data "Ch003" taken in by the input operation of the administrator. The control server apparatus 5 modulates a carrier wave with the allocated center frequency in accordance with the control signal to generate a control carrier signal.

The multiplexer 6 multiplexes the video carrier signals generated and transmitted by the video head end devices 4-1 to 4-3, and the control carrier signal generated and transmitted by the control server apparatus 5. The multiplexer 6 outputs the frequency division multiplexed signal illustrated in a supplementary diagram denoted by a reference sign 41. Note that in a graph of the supplementary diagram denoted by the reference sign 41, a horizontal axis represents a frequency and a vertical axis represents power. In the supplementary diagram denoted by the reference sign 41, the carrier signal indicated by "control" represents the control carrier signal generated by the control server apparatus 5, and the carrier signals indicated by "Ch001," "Ch002," and "Ch003" represent the video carrier signals generated by the video head end devices 4-1, 4-2, and 4-3, respectively.

The transmitter 7 performs the FM conversion on the frequency division multiplexed signal output by the multiplexer 6 using the FM modulator to generate an FM conversion signal which is a wideband FM signal. The transmitter 7 performs the light intensity modulation to generate an optical signal of the FM conversion signal by using the generated FM conversion signal. The transmitter 7 amplifies the generated optical signal to send to the relay communication network 8.

The relay communication network 8 transmits a transmission signal, which is the optical signal of the FM conversion signal sent by the transmitter 7, to the transmission apparatus 9. The transmission apparatus 9 receives the transmission signal transmitted by the relay communication network 8. The transmission apparatus 9 amplifies and transmits the received transmission signal. The light splitter 10 receives the transmission signal transmitted by the transmission apparatus 9 and splits the transmission signal into two. For example, the light splitter 10 sends one to an optical line connecting to the communication network termination apparatus 2A and sends the other to an optical line connecting to the communication network termination apparatus 2B.

Optical-electric conversion units 31A and 31B of the communication network termination apparatuses 2A and 2B receive the transmission signals split and sent by the light splitter 10, respectively. Each of the optical-electric conversion units 31A and 31B converts the received transmission signal into an electrical signal of the FM conversion signal that is a wideband FM signal. FM demodulation units 32A and 32B perform the FM demodulation on the electrical signals of the FM conversion signals output by the optical-electric conversion units 31A and 31B connected thereto, respectively, to restore the frequency division multiplexed signals. The FM demodulation units 32A and 32B output the restored frequency division multiplexed signals.

The demultiplexing units 21A and 21B of the communication network termination apparatuses 2A and 2B demultiplex frequency bands of the control carrier signals from the frequency division multiplexed signals output by the FM demodulation units 32A and 32B connected thereto, respectively. The demultiplexing units 21A and 21B output the demultiplexed control carrier signals to the output control units 25A and 25B connected thereto, respectively. The demultiplexing units 21A and 21B output the frequency division multiplexed signals from which the control carrier signals are separated to filter units 22A and 22B connected thereto, respectively.

The filter units 22A and 22B remove signals of the frequency band including noise signals from the frequency division multiplexed signals output by the demultiplexing units 21A and 21B connected thereto, respectively. Electrical signal amplification units 23A and 23B amplify the frequency division multiplexed signals from which the noise signals are removed by the filter units 22A and 22B connected thereto, respectively. The electrical signal amplification units 23A and 23B output the amplified frequency division multiplexed signals to multiplexing units 24A and 24B connected thereto, respectively.

Hereinafter, in accordance with a flowchart illustrated in FIG. 4, the processing performed by each of the output control units 25A and 25B, the disturbing signal generation units 27A and 27B, the disturbing signal amplification units 28A and 28B, and the multiplexing units 24A and 24B included in the communication network termination apparatuses 2A and 2B will be described.

Processing by Communication Network Termination Apparatus 2A

The output control unit 25A of the communication network termination apparatus 2A takes in the control carrier signal demultiplexed by the demultiplexing unit 21A. The output control unit 25A demodulates the taken control carrier signal to restore the control signal. The output control unit 25A reads out the apparatus identifying data "000002" and the signal specifying data "Ch003" included in the restored control signal (step S1). The output control unit 25A determines whether or not the read apparatus identifying data matches the apparatus identifying data in the item "apparatus identifying data" in the frequency band specifying table 261A in the storage unit 26A (step S2).

In the item "apparatus identifying data" in the frequency band specifying table 261A in the storage unit 26A of the communication network termination apparatus 2A, "000001" is stored. Thus, the output control unit 25A determines that two apparatus identifying data pieces do not match (No in step S2).

The multiplexing unit 24A of the communication network termination apparatus 2A outputs the frequency division multiplexed signal, output by the electrical signal amplification unit 23, illustrated in a supplementary diagram denoted by a reference sign 42A in FIG. 3, to the receiver 3A (step S6). Note that in a graph of the supplementary diagram denoted by the reference sign 42A, a horizontal axis represents a frequency and a vertical axis represents power. As illustrated in the supplementary diagram denoted by the reference sign 42A, a level of each the video carrier signals of "Ch001," "Ch002," and "Ch003", which is influenced by a loss or the like occurring during the transmission, is not completely identical, but is substantially identical, to a level of the video carrier signal illustrated in the supplementary diagram denoted by the reference sign 41.

The receiver 3A receives the signal output by the multiplexing unit 24A. Each of the video carrier signals of "Ch001," "Ch002," and "Ch003" included in the reception signals received by the receiver 3A has a Carrier to Noise Ratio (CNR) of a level at which viewing is enabled as illustrated in a supplementary diagram denoted by a reference sign 43A in FIG. 3, that is, a level at which the video signal can be demodulated. Note that in a graph of the supplementary diagram denoted by the reference sign 43A, a horizontal axis represents a frequency in [MHz] and a vertical axis represents a CNR in "dB".

Because the level of the CNR is a level at which the video signal can be demodulated, even when the user of the receiver 3A uses an input device such as a remote controller to select any of "Ch001," "Ch002," and "Ch003", the receiver 3A can demodulate the video carrier signal corresponding to "Ch001," "Ch002," or "Ch003" to display a normal video on the display screen.

Processing by Communication Network Termination Apparatus 2B

As illustrated in a supplementary diagram denoted by a reference sign 61 in FIG. 3, the output control unit 25B of the communication network termination apparatus 2B takes in the control carrier signal demultiplexed by the demultiplexing unit 21B. The output control unit 25B demodulates the taken control carrier signal to restore the control signal. The output control unit 25B reads out the apparatus identifying data "000002" and the signal specifying data "Ch003" included in the restored control signal (step S1). The output control unit 25B determines whether or not the read apparatus identifying data matches the apparatus identifying data in the item "apparatus identifying data" in the frequency band specifying table 261B in the storage unit 26B (step S2).

In the item "apparatus identifying data" in the frequency band specifying table 261B in the storage unit 26B of the communication network termination apparatus 2B, "000002" is stored. Thus, the output control unit 25B determines that two apparatus identifying data pieces match (Yes in step S2).

The output control unit 25B refers to the frequency band specifying table 261B to read out the frequency band specifying data corresponding to the signal specifying data "Ch003" (step S3). The output control unit 25B reads out the frequency band specifying data including the center frequency "414 MHz" and the frequency bandwidth "5.5 MHz".

The output control unit 25B outputs the read frequency band specifying data including the center frequency "414 MHz" and the frequency bandwidth "5.5 MHz" to the disturbing signal generation unit 27B. The disturbing signal generation unit 27 generates a disturbing signal in accordance with the frequency band specifying data output by the output control unit 25B.

The disturbing signal generation unit 27B generates the disturbing signal having, for example, a frequency bandwidth that is equal to or less than the frequency bandwidth "5.5 MHz" included in the frequency band specifying data and a center frequency that is the center frequency "414 MHz" included in the frequency band-specific data. The disturbing signal generation unit 27B outputs the generated disturbing signal to the disturbing signal amplification unit 28B. The disturbing signal amplification unit 28B amplifies the disturbing signal output by the disturbing signal generation unit 27B to output to the multiplexing unit 24B (step S4). The disturbing signal amplification unit 28B amplifies the disturbing signal to be approximately 75% of the output level of the electrical signal amplification unit 23B, for example.

The multiplexing unit 24B multiplexes and transmits to the receiver 3B, the frequency division multiplexed signal that is amplified and output by the electrical signal amplification unit 23B, i.e., the video carrier signal of each of "Ch001," "Ch002," and "Ch003", and the disturbing signal that is amplified and output by the disturbing signal amplification unit 28B (step S5).

The center frequency of the disturbing signal matches the center frequency of the video carrier signal of "Ch003". Therefore, the frequency division multiplexed signal output by the multiplexing unit 24B is, for each of the video carrier signals of "Ch001" and "Ch002", the signal output by the electrical signal amplification unit 23B, but is, for the video carrier signal of "Ch003", the signal on which the disturbing signal is superimposed, as illustrated in a supplementary diagram denoted by a reference sign 42B in FIG. 3.

The receiver 3B receives the signal output by the multiplexing unit 24B. Each of the video carrier signals of "Ch001" and "Ch002" included in the reception signals received by the receiver 3B has a CNR of a level at which the video signal can be demodulated as illustrated in a supplementary diagram denoted by a reference sign 43B in FIG. 3. In contrast, the video carrier signal corresponding to "Ch003", on which the disturbing signal is superimposed, has a CNR of a level equal to or less than the level at which the video signal can be demodulated. Note that in a graph of the supplementary diagram denoted by the reference sign 43B, a horizontal axis represents a frequency in [MHz] and a vertical axis represents a CNR in "dB", similarly to the graph of the supplementary diagram denoted by the reference sign 43A.

Because of the level of the CNR as illustrated in the supplementary diagram denoted by the reference sign 43B, when the user of the receiver 3B uses an input device such as a remote controller to select "Ch001" or "Ch002", the receiver 3B can demodulate the video carrier signal corresponding to "Ch001" or "Ch002" to display a normal video on the display screen.

On the other hand, when the user of the receiver 3B uses an input device such as a remote controller to select "Ch003", the signal quality is degraded because the disturbing signal is superimposed on the video carrier signal. Therefore, the receiver 3B cannot correctly demodulate the video carrier signal corresponding to "Ch003", and so, cannot display the normal video on the display screen. As a result, in the control server apparatus 5, viewing of the video of "Ch003" corresponding to the designated signal specifying data can be restricted for the receiver 3B connected to the designated communication network termination apparatus 2B.

Second Embodiment

Figure 5:
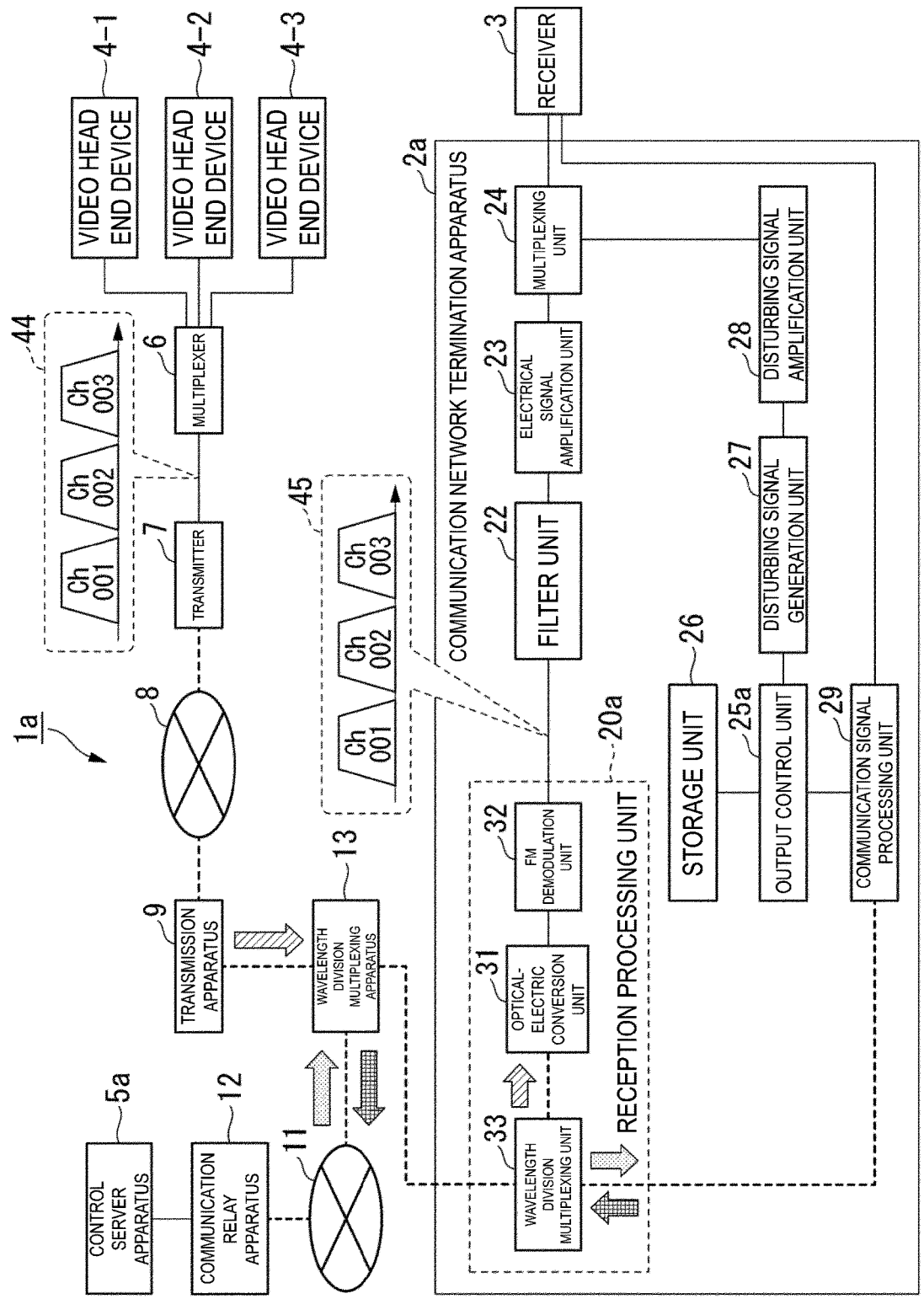
FIG. 5 is a block diagram illustrating a configuration of a communication system according to a second embodiment.

FIG. 5 is a block diagram illustrating a configuration of a communication system 1a according to a second embodiment. The same components in FIG. 5 as those of the communication system 1 in the first embodiment illustrated in FIG. 1 are denoted by the same reference signs, and different components will be described below. Note that in the second embodiment, the transmission apparatus 9 is a V-OLT defined in NPL 2.

The communication network termination apparatus 2 in the first embodiment has the configuration on the basis of the configuration of the V-ONU to which the configuration for generating and superimposing the disturbing signal is added. Because of the configuration on the basis of the configuration of the V-ONU, the communication network termination apparatus 2 does not have a configuration for transmitting and/or receiving the signal directly to and from the control server apparatus 5. For this reason, the control server apparatus 5 is configured to use the frequency band in a free state of a route for transmitting the video signal, which is the main signal, like an Auxiliary Management and Control Channel (AMCC), to transmit the control signal to the communication network termination apparatus 2.

In contrast, the communication network termination apparatus 2a according to the second embodiment has a configuration on the basis of a V-ONU integrated with a communication function (hereinafter, referred to as a "GV-ONU" (Gigabit ethernet (trade name) and Video-Optical Network Unit) that can transmit and/or receive a communication signal to/from the control server apparatus 5a, to which the configuration for generating and superimposing the disturbing signal is added. Therefore, the communication system 1a according to the second embodiment has a configuration different from the communication system 1 according to the first embodiment in that the control server apparatus 5a transmits a control signal through the route for transmitting the communication signal.

The communication system 1a includes the video head end devices 4-1, 4-2, and 4-3, the multiplexer 6, the transmitter 7, the relay communication network 8, the transmission apparatus 9, a wavelength division multiplexing apparatus 13, a control communication network 11, a communication relay apparatus 12, the control server apparatus 5a, the communication network termination apparatus 2a, and the receiver 3. Note that in FIG. 2, a solid connection line indicates an electrical line connected by an electrical wiring line, and a dotted connection line indicates an optical line connected by an optical fiber, for example.

The control server apparatus 5a has the same configuration as the configuration included in the control server apparatus 5 according to the first embodiment except for the following points. The control server apparatus 5 according to the first embodiment, in transmitting the generated control signal, modulates the carrier wave with the allocated center frequency in accordance with the control signal to generate and transmit the control carrier signal. In contrast, the control server apparatus 5a includes a configuration different from the control server apparatus 5 in that the control server apparatus 5a transmits the generated control signal to the communication relay apparatus 12 without converting the generated control signal into the control carrier signal.

The control communication network 11 includes a plurality of transmission apparatuses. The communication relay apparatus 12 is illustrated as being connected to the control communication network 11 via an optical line for convenience of description, but is one of the transmission apparatuses included in the control communication network 11. The communication relay apparatus 12 converts the control signal of the electrical signal transmitted by the control server apparatus 5a into the control signal of an optical signal and transmits the control signal to other transmission apparatuses included in the control communication network 11. The control communication network 11 transmits the control signal of the optical signal transmitted by the communication relay apparatus 12 to the wavelength division multiplexing apparatus 13. The control communication network 11 receives the optical signal transmitted by the wavelength division multiplexing apparatus 13 and then transmits the received optical signal to the communication relay apparatus 12. The communication relay apparatus 12 converts the transmitted optical signal into an electrical signal and transmits the electrical signal to the control server apparatus 5a. The control communication network 11 is an IP network, for example.

The wavelength division multiplexing apparatus 13 includes wavelength division multiplexing (WDM) Multiplexer (MUX) and Demultiplexer (DeMUX).

The communication network termination apparatus 2a includes a reception processing unit 20a, the filter unit 22, the electrical signal amplification unit 23, the multiplexing unit 24, an output control unit 25a, the storage unit 26, the disturbing signal generation unit 27, the disturbing signal amplification unit 28, and a communication signal processing unit 29. Note that, in the communication network termination apparatus 2a, function units of the reception processing unit 20a, the filter unit 22, the electrical signal amplification unit 23, and the communication signal processing unit 29 have the same configurations as the function units included in the GV-ONU. However, the communication signal processing unit 29 is different from the GV-ONU in having a configuration to which added is a configuration in which the received control signal is output to output control unit 25a when the control signal generated by the control server apparatus 5a is received.

The reception processing unit 20a includes a wavelength division multiplexing unit 33, the optical-electric conversion unit 31, and the FM demodulation unit 32. The wavelength division multiplexing unit 33 includes WDM MUX and DeMUX.

Hereinafter, configurations of the wavelength division multiplexing apparatus 13 and the wavelength division multiplexing unit 33 are described. An optical line between the wavelength division multiplexing apparatus 13 and the wavelength division multiplexing unit 33 is the optical line in a WDM section where the wavelength-multiplexed optical signal is transmitted. Each of the wavelength division multiplexing apparatus 13 and the wavelength division multiplexing unit 33, when receiving an optical signal from a port connected to other apparatus, replaces a wavelength of the optical signal received by the MUX included therein with another wavelength associated in advance with the port thereof to send to the optical line in the WDM section. The optical signal transmitted by the MUX of the wavelength division multiplexing apparatus 13 is received by the DeMUX of the opposite wavelength division multiplexing unit 33. Conversely, the optical signal transmitted by the MUX of the wavelength division multiplexing unit 33 is received by the DeMUX of the opposite wavelength division multiplexing apparatus 13. The DeMUX demultiplexes the received optical signal per wavelength. The DeMUX returns the wavelength of the demultiplexed optical signal per wavelength to the wavelength before being replaced by the opposite MUX, and then, transmits the resultant optical signal to other apparatus connecting to the port associated in advance with each wavelength.

For example, the wavelength division multiplexing apparatus 13 receives the optical signal transmitted by the transmission apparatus 9, and then, replaces the wavelength of the received optical signal with a first wavelength to send to the optical line in the WDM section. The wavelength division multiplexing unit 33 demultiplexes the optical signal received through the optical line in the WDM section. The wavelength division multiplexing unit 33 returns the wavelength of the optical signal having the first wavelength in the demultiplexed optical signals to the original wavelength, and then, outputs to the optical-electric conversion unit 31.

The wavelength division multiplexing apparatus 13 receives the optical signal through the control communication network 11, and then, replaces the wavelength of the received optical signal with a second wavelength to send to the optical line in the WDM section. The wavelength division multiplexing unit 33 demultiplexes the optical signal received through the optical line in the WDM section. The wavelength division multiplexing unit 33 returns the wavelength of the optical signal having the second wavelength in the demultiplexed optical signals to the original wavelength, and then, outputs to the communication signal processing unit 29.

The wavelength division multiplexing unit 33 takes in the optical signal output by the communication signal processing unit 29, and then, replaces the wavelength of the taken optical signal with a third wavelength to send to the optical line of the WDM section. The wavelength division multiplexing apparatus 13 demultiplexes the optical signal received through the optical line in the WDM section. The wavelength division multiplexing apparatus 13 returns the wavelength of the optical signal having the third wavelength in the demultiplexed optical signals to the original wavelength, and then, transmits through the control communication network 11 to the control server apparatus 5a.

Note that, as for the wavelength multiplexed in the optical line in the WDM section, for example, 1.55 μm is adopted for the first wavelength, 1.49 μm is adopted for the second wavelength, and 1.31 is adopted μm for the third wavelength.

The communication signal processing unit 29 receives the communication signal from the receiver 3, and then, converts the received communication signal into an optical signal. The communication signal processing unit 29 outputs the converted optical signal to the wavelength division multiplexing unit 33. The communication signal processing unit 29 receives the optical signal from the wavelength division multiplexing unit 33, and then, converts the received optical signal into an electrical signal. In a case that the signal included in the converted electrical signal is a control signal, the communication signal processing unit 29 outputs the control signal to the output control unit 25a. In a case that the signal included in the converted electrical signal is a communication signal, the communication signal processing unit 29 transmits the communication signal to the receiver 3.

The output control unit 25a has the same configuration as the output control unit 25 according to the first embodiment except for the following points. The output control unit 25 according to the first embodiment demodulates the control carrier signal demultiplexed by the demultiplexing unit 21 to restore the control signal. In contrast, in the second embodiment, the communication signal processing unit 29 outputs the control signal rather than the control carrier signal, and thus, the output control unit 25a takes in the control signal output by the communication signal processing unit 29 and reads out the apparatus identifying data and the signal specifying data from the taken control signal.

Processing by Communication System according to Second Embodiment

Figure 6:
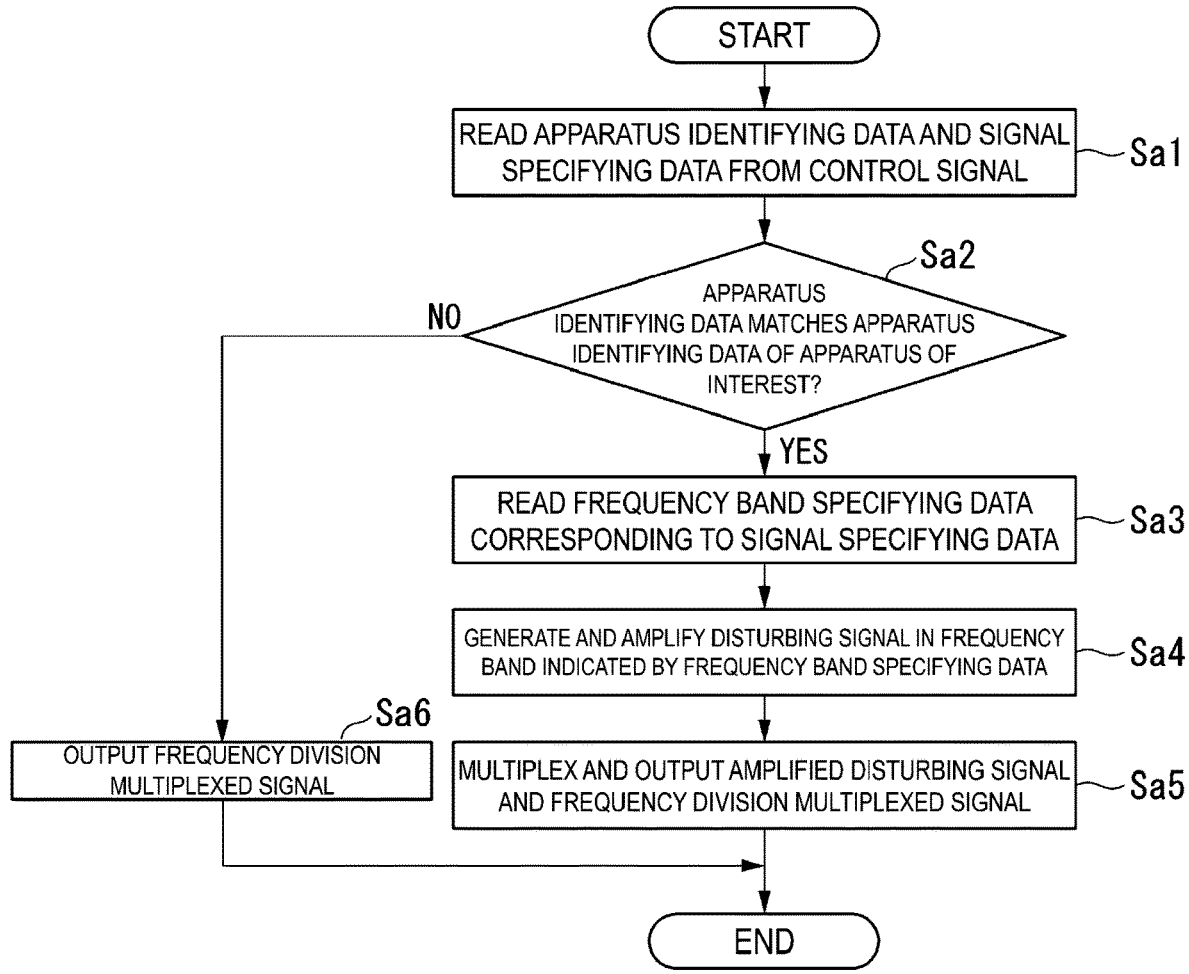
FIG. 6 is a flowchart illustrating a flow of processing performed by a communication network termination apparatus according to the second embodiment.

FIG. 6 is a flowchart illustrating a flow of processing performed by the output control unit 25a, the disturbing signal generation unit 27, the disturbing signal amplification unit 28, and the multiplexing unit 24 of the communication network termination apparatus 2a according to the second embodiment.

A difference between the communication system 1 according to the first embodiment and the communication system 1a according to the second embodiment is a difference in transmission of the control signal: whether the control signal is transmitted using the route for transmitting the video signal which is the main signal, or using the route for transmitting the communication signal different from the route for transmitting the main signal.

Written to the item "apparatus identifying data" in the frequency band specifying table 261 in the storage unit 26 of the communication network termination apparatus 2a is the apparatus identifying data that is previously assigned to the communication network termination apparatus 2a, similarly to the first embodiment. The writing of the apparatus identifying data to the item "apparatus identifying data" is performed directly to the communication network termination apparatus 2a, or performed by the management device connected via the communication line for management, similarly to the first embodiment.

Written to the items "signal specifying data" and "frequency band specifying data" in the frequency band specifying table 261 are record values corresponding to the items of "signal specifying data" of "Ch001," "Ch002," and "Ch003" illustrated in FIG. 2, similarly to the first embodiment. Update of the data to the items "signal specifying data" and "frequency band specifying data" is performed by the output control unit 25a, similarly to the first embodiment. Specifically, in a case that the control signal transmitted by the control server apparatus 5a includes the update data, the output control unit 25a updates the items "signal specifying data" and "frequency band specifying data" in the frequency band specifying table 261 in accordance with the update data included in the control signal.

Hereinafter, the processing until step Sa1 in FIG. 6 will be described. The administrator of the control server apparatus 5a performs, in the control server apparatus 5a, an input operation for inputting the apparatus identifying data and the signal specifying data, the apparatus identifying data corresponding to the communication network termination apparatus 2a connecting to the receiver 3 for performing the restriction of viewing, the signal specifying data specifying a frequency band of a video carrier signal corresponding to the video subjected to the restriction of viewing. The control server apparatus 5a generates a control signal including the apparatus identifying data and signal specifying data taken in by the input operation of the administrator. The control server apparatus 5a transmits the generated control signal to the communication relay apparatus 12.

The communication relay apparatus 12 converts the control signal of the electrical signal transmitted by the control server apparatus 5a into the control signal of an optical signal. The communication relay apparatus 12 transmitting the control signal of the optical signal makes the control communication network 11 transmit the control signal of the optical signal to the wavelength division multiplexing apparatus 13. The wavelength division multiplexing apparatus 13 receives the transmission signal transmitted by the control communication network 11, and then, replaces the wavelength of the received transmission signal with the second wavelength to send to the optical line in the WDM section.

The video head end devices 4-1 to 4-3 modulate the carrier waves at the respective center frequencies allocated thereto in accordance with the video signals to generate the video carrier signals. The multiplexer 6 multiplexes the video carrier signals generated and transmitted by the video head end devices 4-1 to 4-3. The multiplexer 6 outputs frequency division multiplexed signals obtained by the multiplexing of the signals. The frequency division multiplexed signals include three video carrier signals corresponding to the channel identifying data "Ch001," "Ch002," and "Ch003" generated by the video head end devices 4-1 to 4-3, respectively, as illustrated in a supplementary diagram denoted by a reference sign 44. Note that in a graph of the supplementary diagram denoted by the reference sign 44, a horizontal axis represents a frequency and a vertical axis represents power.

The transmitter 7 performs the FM conversion on the frequency division multiplexed signal output by the multiplexer 6 using the FM modulator to generate an FM conversion signal which is a wideband FM signal. The transmitter 7 performs the light intensity modulation to generate an optical signal of the FM conversion signal by using the generated FM conversion signal. The transmitter 7 amplifies the generated optical signal to send to the relay communication network 8.

The transmission apparatus 9 receives the transmission signal transmitted by the relay communication network 8. The transmission apparatus 9 amplifies the received transmission signal and transmits the amplified signal to the wavelength division multiplexing apparatus 13. The wavelength division multiplexing apparatus 13 replaces the wavelength of the transmission signal received from the transmission apparatus 9 with the first wavelength to send to the optical line in the WDM section.

The wavelength division multiplexing unit 33 of the communication network termination apparatus 2a demultiplexes the optical signal received through the optical line in the WDM section. The wavelength division multiplexing unit 33 returns the wavelength of the optical signal having the first wavelength in the demultiplexed optical signals to the original wavelength before being replaced, and then, outputs to the optical-electric conversion unit 31. As a result, the optical-electric conversion unit 31 receives the transmission signal transmitted by the transmission apparatus 9, that is, the optical signal of the FM conversion signal.

The wavelength division multiplexing unit 33 demultiplexes the optical signal received through the optical line in the WDM section. The wavelength division multiplexing unit 33 returns the wavelength of the optical signal having the second wavelength in the demultiplexed optical signals to the original wavelength before being replaced, and then, outputs to the communication signal processing unit 29. As a result, the communication signal processing unit 29 receives the transmission signal transmitted by the control communication network 11, that is, the optical signal of the control signal.

The optical-electric conversion unit 31 takes in the optical signal of the FM conversion signal output by the wavelength division multiplexing unit 33, and converts the taken optical signal of the FM conversion signal into an electrical signal to output the electrical signal. The FM demodulation unit 32 performs the FM demodulation on the electrical signal of the FM conversion signal output by the optical-electric conversion unit 31 to restore the frequency division multiplexed signal. The restored frequency division multiplexed signal includes three video carrier signals of "Ch001," "Ch002," and "Ch003" as illustrated in a supplementary diagram denoted by a reference sign 45. Note that in a graph of the supplementary diagram denoted by the reference sign 45, a horizontal axis represents a frequency and a vertical axis represents power.

The FM demodulation unit 32 outputs the restored frequency division multiplexed signal to the filter unit 22. The filter unit 22 removes a signal of the frequency band including a noise signal from the frequency division multiplexed signal output by the FM demodulation unit 32. The electrical signal amplification unit 23 amplifies the frequency division multiplexed signal from which the noise signal is removed by the filter unit 22. The electrical signal amplification unit 23 outputs the amplified frequency division multiplexed signal to the multiplexing unit 24.

The communication signal processing unit 29 takes in the optical signal of the control signal output by the wavelength division multiplexing unit 33, and converts the taken optical signal of the control signal into an electrical signal. The communication signal processing unit 29 outputs the control signal converted into the electrical signal to the output control unit 25*a*.

As illustrated in a flowchart of FIG. 6, the output control unit 25*a* takes in the control signal output by the communication signal processing unit 29, and reads out the apparatus identifying data and the signal specifying data from the taken control signal (step Sa1). In the following processing of steps Sa2 to Sa6, the processing similar to steps S2 to S6 according to the first embodiment illustrated in FIG. 4 is performed by the output control unit 25*a*, the disturbing signal generation unit 27, the disturbing signal amplification unit 28, and the multiplexing unit 24.

For example, assume that the communication system 1*a* according to the second embodiment includes two communication network termination apparatuses 2*a* and two receivers 3, similarly to the configuration illustrated in FIG. 3. In this configuration, two respective communication network termination apparatuses 2*a* are represented by communication network termination apparatuses 2Aa and 2Ba, and the respective receivers 3 are represented by receivers 3A and 3B, where the communication network termination apparatus 2Aa and the receiver 3A are connected to each other and installed in the area A, and the communication network termination apparatus 2Ba and the receiver 3B are connected to each other and installed in the area B. The communication network termination apparatus 2Aa and the communication network termination apparatus 2Ba are connected to the wavelength division multiplexing apparatus 13 via the light splitter 10. Assume that the communication network termination apparatus 2Aa is previously assigned with the apparatus identifying data "000001", and the communication network termination apparatus 2Ba is previously assigned with the apparatus identifying data "000002".

In a case that viewing of the video corresponding to the channel identifying data "Ch003" is restricted in the area B, the control signal including the apparatus identifying data "000002" and the signal specifying data "Ch003" is transmitted from the control server apparatus 5*a*. Each of the communication network termination apparatuses 2Aa and 2Ba receiving the control signal performs the processing illustrated in FIG. 6, where the communication network termination apparatus 2Ba superimposes the disturbing signal on the video carrier signal corresponding to the channel identifying data "Ch003" to output to the receiver 3B.

As a result, in the second embodiment also, similarly to the first embodiment, even when the user of the receiver 3A uses an input device such as a remote controller to select any piece of the channel identifying data "Ch001," "Ch002," and "Ch003", the receiver 3A can demodulate the video carrier signal corresponding to the channel identifying data "Ch001," "Ch002," or "Ch003" to display a normal video on the display screen.

In contrast, when the user of the receiver 3B uses an input device such as a remote controller to select "Ch001" or "Ch002", the receiver 3B can demodulate the video carrier signal of "Ch001" or "Ch002" to display a normal video on the display screen. On the other hand, when the user of the receiver 3B uses an input device such as a remote controller to select "Ch003", the receiver 3B cannot correctly demodulate the video carrier signal of "Ch003", and so, cannot display a normal video on the display screen. As a result, in the control server apparatus 5*a*, viewing of the video of "Ch003" corresponding to the designated signal specifying data can be restricted for the receiver 3B connected to the designated communication network termination apparatus 2B.

Summary of First and Second Embodiments

In the communication systems 1 and 1*a* in the first and second embodiments described above, the transmitter 7 performs the FM conversion on the frequency division multiplexed signals. Further, the transmitter 7 performs conversion into optical signal to generate the optical signal of the FM conversion signals to send to the relay communication network 8. The relay communication network 8 transmits, as the transmission signals, the optical signal of the FM conversion signal transmitted by the transmitter 7. The control server apparatus 5, 5*a* transmits, to the communication network termination apparatus 2, 2*a*, the apparatus identifying data specifying an apparatus to be requested to perform signal quality degradation for performing restriction of viewing, and the signal specifying data specifying a video carrier signal requesting signal quality degradation among a plurality of video carrier signals included in the frequency division multiplexed signals. In the communication network termination apparatus 2, 2*a*, the reception processing unit 20, 20*a* receives the transmission signal transmitted by the relay communication network 8, converts the received transmission signal into an electrical signal, performs the FM demodulation on the converted electrical signal to restore the frequency division multiplexed signal to output. The storage unit 26 stores the apparatus identifying data of the apparatus in which the storage unit 26 is included. The output control unit 25, 25*a* acquires the apparatus identifying data and the signal specifying data transmitted by the control server apparatus 5, 5*a*, and in a case that the acquired apparatus identifying data matches the apparatus identifying data stored in the storage unit 26 of the apparatus in which the storage unit 26 is included, the output control unit 25, 25*a* outputs the frequency band specifying data indicating the frequency band corresponding to the signal specifying data. The disturbing signal generation unit 27 generates a disturbing signal in the frequency band corresponding to the frequency band specifying data output by the output control unit 25, 25*a*. The multiplexing unit 24 multiplexes the frequency division multiplexed signals and the disturbing signal to transmit to the receiver 3.

Specifically, according to the configuration of the first and second embodiments described above, in the control server apparatuses 5, 5*a*, the communication network termination apparatus 2, 2*a* connecting to the receiver 3 to be requested to perform signal quality degradation for performing restriction of viewing can be designated, and further, the frequency band of the video carrier signal corresponding to the video to be requested to undergo signal quality degradation for performing restriction of viewing can be designated. The designated communication network termination apparatus 2, 2*a* generates a disturbing signal in the designated frequency band so that the signal quality of the video carrier signal in the designated frequency band is degraded, and superimposes the generated disturbing signal on the frequency division multiplexed signals. This disables the receiver 3 connected to the communication network termination apparatus 2, 2*a* from correctly demodulating the video carrier signal in the designated frequency band. Therefore, the restriction of the viewing of the video corresponding to the designated frequency band can be performed for the receiver 3 connected to the designated communication network termination apparatus 2, 2*a*.

Figure 11:
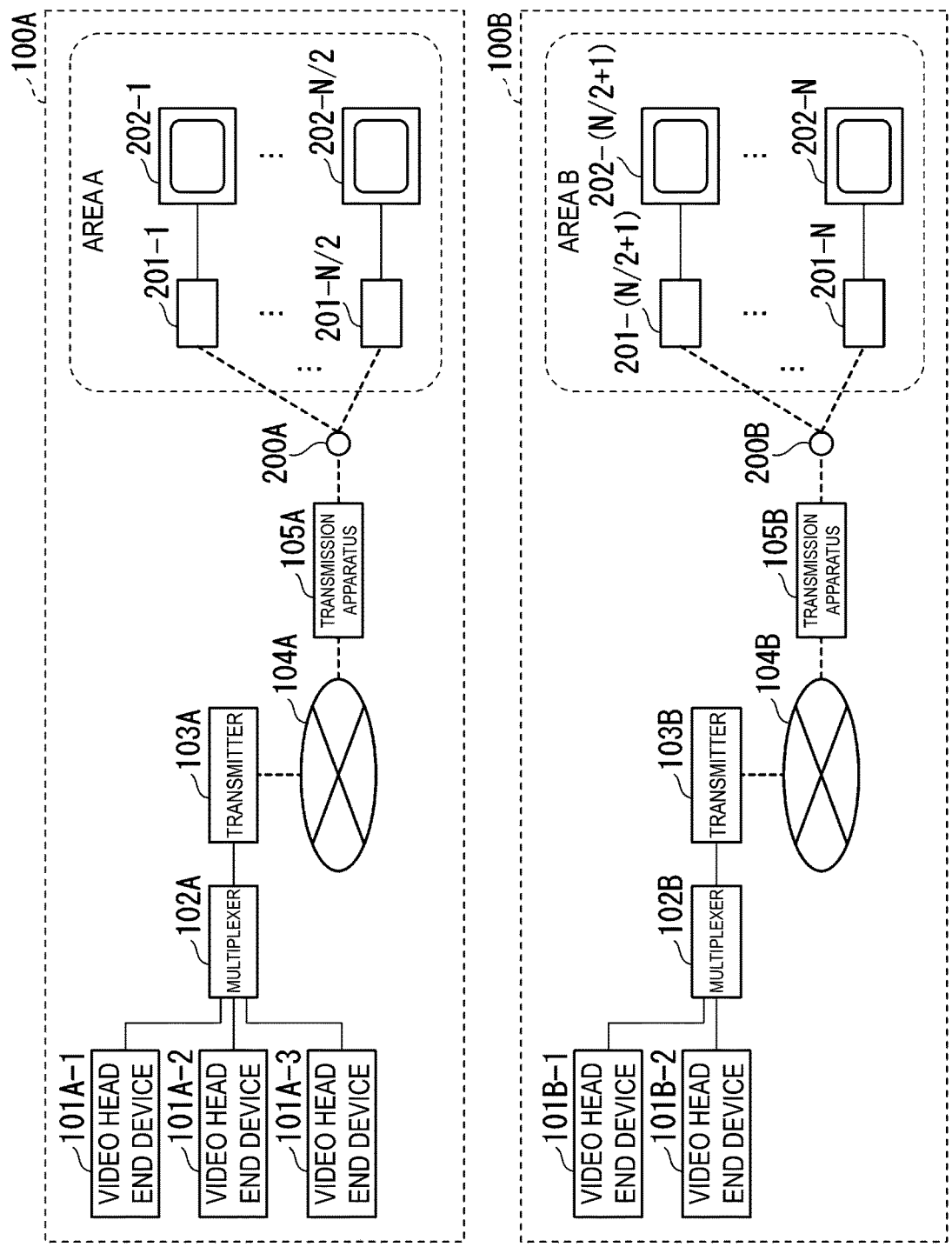
FIG. 11 is a diagram illustrating a configuration of a communication system that adopts viewing restriction for a video of a specific channel per area.

Therefore, use of the communication system 1, 1*a* according to the first and second embodiments eliminates the need to construct the system for each area as in two communication systems 100A and 100B illustrated in FIG. 11. In the communication system 1, 1*a*, the video signal to be transmitted does not need to be encrypted so that there is no risk of the code being analyzed and the video being viewed, and the subscriber management in performing the restriction of viewing can be implemented independently of a reception area.

Because the video signal is not encrypted, the capacity for transmitting and storing cryptographic key data can be reduced. In the first embodiment, the control signal is transmitted as a signal in the frequency band that does not overlap the frequency band of the video carrier signal, and thus, does not affect transmission quality of the video signal. In the second embodiment, the control signal is transmitted using a route different from the route for transmitting the video signal which is the main signal, and thus, does not affect the transmission quality of the video signal.

Accordingly, it is possible to restrict reproduction of a specific signal in the individual receiver 3 at low cost and without the risk of the code being decrypted and invalidated, in the case of transmitting a plurality of signals using the frequency division multiplexing scheme through the relay communication network 8 that is the wired communication network.

Third Embodiment

Figure 7:
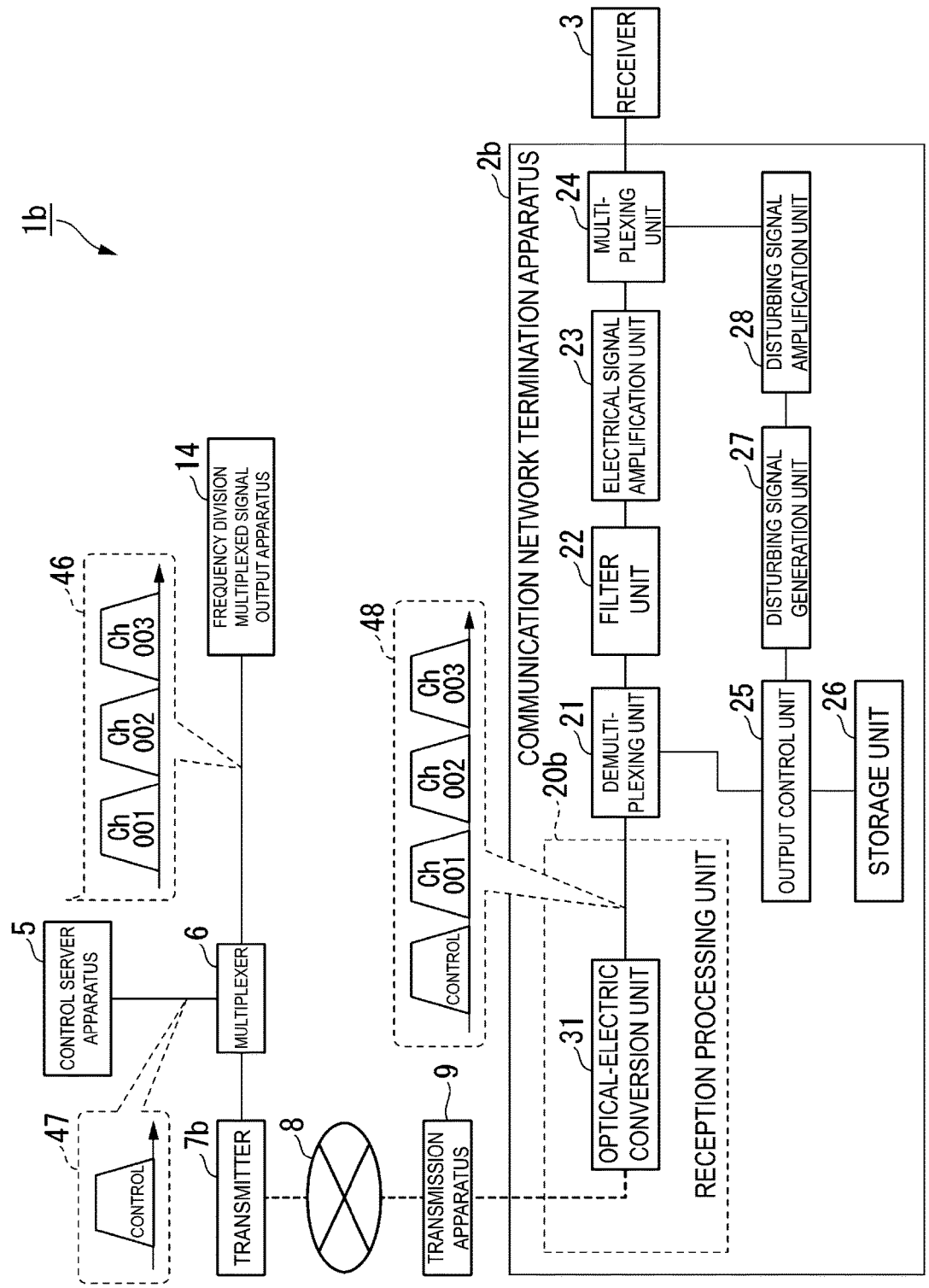
FIG. 7 is a block diagram illustrating a configuration of a communication system according to a third embodiment.

FIG. 7 is a block diagram illustrating a configuration of a communication system 1*b* according to a third embodiment. In the first embodiment described above, a plurality of video carrier signals and the control carrier signal are multiplexed to generate the frequency division multiplexed signal, and the generated frequency division multiplexed signal is converted by the FM conversion. In contrast, in the communication system 1*b* according to the third embodiment, the FM conversion is not performed on the generated frequency division multiplexed signal, which is different from the communication system 1 according to the first embodiment.

In FIG. 7, the same components as those of the first embodiment are denoted by the same reference signs and different components will be described below. The communication system 1*b* includes a frequency division multiplexed signal output apparatus 14, the control server apparatus 5, the multiplexer 6, a transmitter 7*b*, the relay communication network 8, the transmission apparatus 9, a communication network termination apparatus 2*b*, and the receiver 3. Note that in FIG. 7, a solid connection line indicates an electrical line connected by an electrical wiring line, and a dotted connection line indicates an optical line connected by an optical fiber, for example.

The frequency division multiplexed signal output apparatus 14 modulates the respective carrier waves with the plurality of previously allocated center frequencies in accordance with the different video signals to generate a plurality of video carrier signals having the frequency bands that do not overlap each other, as illustrated in a supplementary diagram denoted by a reference sign 46. Note that in a graph of the supplementary diagram denoted by the reference sign 46, a horizontal axis represents a frequency and a vertical axis represents power. The frequency division multiplexed signal output apparatus 14 multiplexes the plurality of generated video carrier signals to generate frequency division multiplexed signal and transmit the generated frequency division multiplexed signal to the multiplexer 6.

The control server apparatus 5 has the same configuration as that in the first embodiment, and a center frequency different from the plurality of center frequencies allocated to the frequency division multiplexed signal output apparatus 14 is previously allocated to the control server apparatus 5. The control server apparatus 5 modulates the carrier wave with the allocated center frequency in accordance with the control signal to generate a control carrier signal at a frequency band that does not overlap the frequency band of the frequency division multiplexed signal output by the frequency division multiplexed signal output apparatus 14, as illustrated in a supplementary diagram denoted by a reference sign 47. Note that in a graph of the supplementary diagram denoted by the reference sign 47, a horizontal axis represents a frequency and a vertical axis represents power.

The transmitter 7*b*, which does not perform the FM conversion unlike the transmitter 7 according to the first embodiment, includes therein a light source, a light modulator, and a light modulator, but no FM modulator. Then, the transmitter 7*b* performs light intensity modulation by using the light modulator on a light from the light source by way of the frequency division multiplexed signal output by the multiplexer 6 to generate an optical signal of the frequency division multiplexed signal. The transmitter 7 amplifies the optical signal by using the light modulator to send the amplified optical signal to the relay communication network 8.

The communication network termination apparatus 2*b* includes a reception processing unit 20*b*, the demultiplexing unit 21, the filter unit 22, the electrical signal amplification unit 23, the multiplexing unit 24, the output control unit 25, the storage unit 26, the disturbing signal generation unit 27, and the disturbing signal amplification unit 28. The reception processing unit 20*b*, which does not demodulate the signals subjected to the FM conversion unlike the reception processing unit 20 according to the first embodiment, includes the optical-electric conversion unit 31, but no FM demodulation unit 32.

Then, the signal output by the optical-electric conversion unit 31 in the first embodiment is a wide band FM signal, whereas the signal output by the optical-electric conversion unit 31 in the third embodiment is the frequency division multiplexed signal including a plurality of video carrier signals and the control carrier signal as illustrated in a supplementary diagram denoted by a reference sign 48, because the transmitter 7*b* does not perform the FM conversion. In other words, the signal output by the optical-electric conversion unit 31 according to the third embodiment matches in form the signal output by the FM demodulation unit 32 according to the first embodiment. Note that in a graph of the supplementary diagram denoted by the reference sign 48, a horizontal axis represents a frequency and a vertical axis represents power.

However, in practice, by comparison of the scheme as in the third embodiment in which the frequency division multiplexed signal is subjected to the light intensity modulation and transmitted, and the scheme as in the first embodiment in which the frequency division multiplexed signal is subjected to the FM conversion and then subjected to the light intensity modulation, the scheme using the FM conversion is more improved in tolerance to noise or distortion in an optical transmission section.

As described above, because the signal output by the optical-electric conversion unit 31 according to the third embodiment matches in form the signal output by the FM demodulation unit 32 according to the first embodiment, the same processing as that performed in the communication system 1 according to the first embodiment is performed in the communication system 1b according to the third embodiment, except that the transmitter 7b does not perform the FM conversion and the reception processing unit 20b does not demodulate the FM signals.

For this reason, in the communication system 1b according to third embodiment, similarly to the communication system 1 according to the first embodiment, in the control server apparatuses 5, the communication network termination apparatus 2b connecting to the receiver 3 to be requested to perform signal quality degradation for performing restriction of viewing can be designated, and further, the frequency band of the video carrier signal corresponding to the video to be requested to undergo signal quality degradation for performing restriction of viewing can be designated. The designated communication network termination apparatus 2b generates a disturbing signal in the designated frequency band so that the signal quality of the video carrier signal in the designated frequency band is degraded, and superimposes the generated disturbing signal on the frequency division multiplexed signals. This disables the receiver 3 connected to the communication network termination apparatus 2b from correctly demodulating the signal in the designated frequency band. Therefore, the restriction of the viewing of the video corresponding to the designated frequency band can be performed for the receiver 3 connected to the designated communication network termination apparatus 2b.

Accordingly, the communication system 1b has the same effect as the communication system 1 according to the first embodiment, and it is possible to restrict reproduction of a specific signal in the individual receiver 3 at low cost and without the risk of the code being decrypted and invalidated, in the case of transmitting a plurality of signals using the frequency division multiplexing scheme through the relay communication network 8 that is the wired communication network.

Fourth Embodiment

Figure 8:
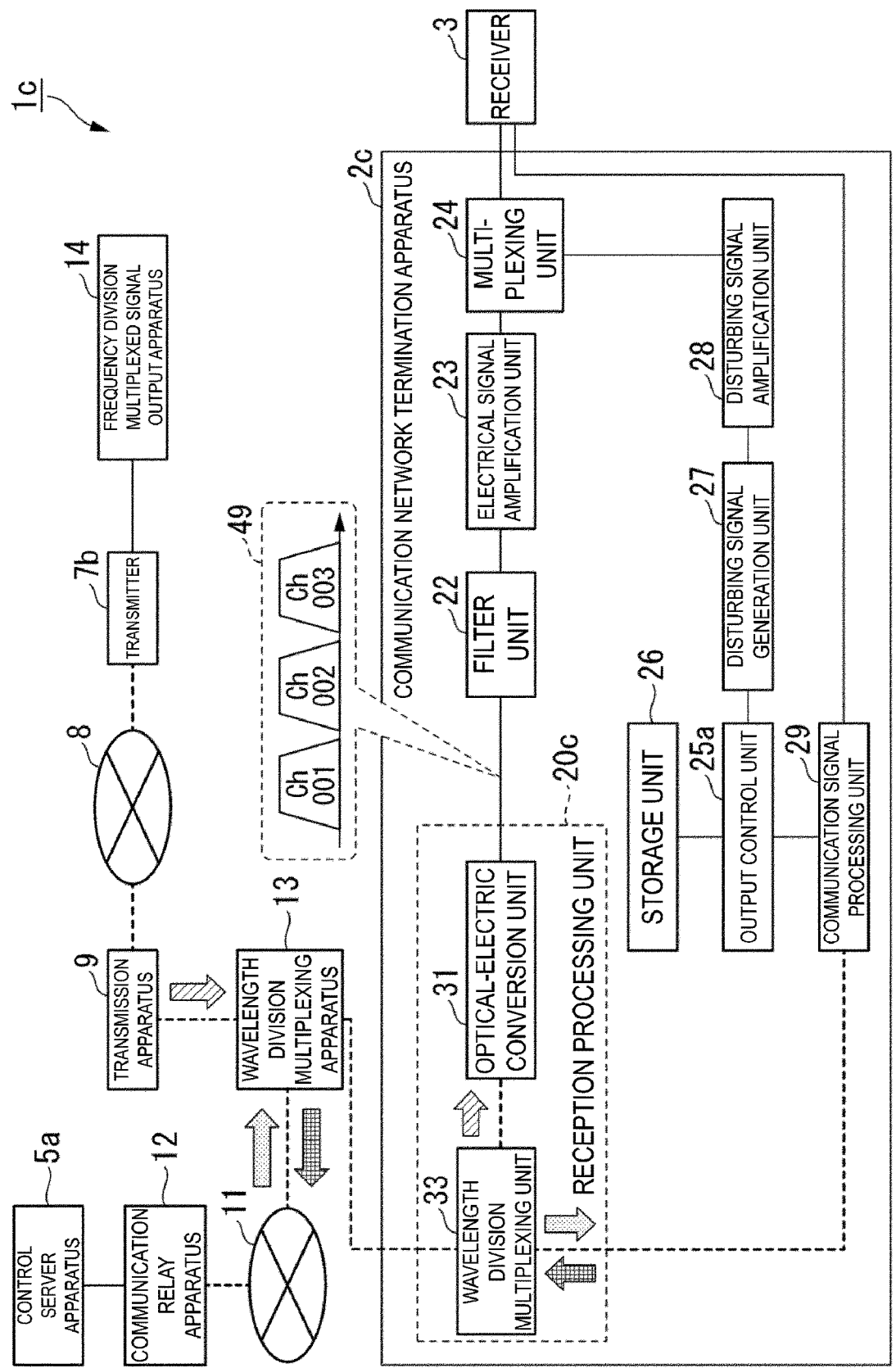
FIG. 8 is a block diagram illustrating a configuration of a communication system according to a fourth embodiment.
Figure 9:
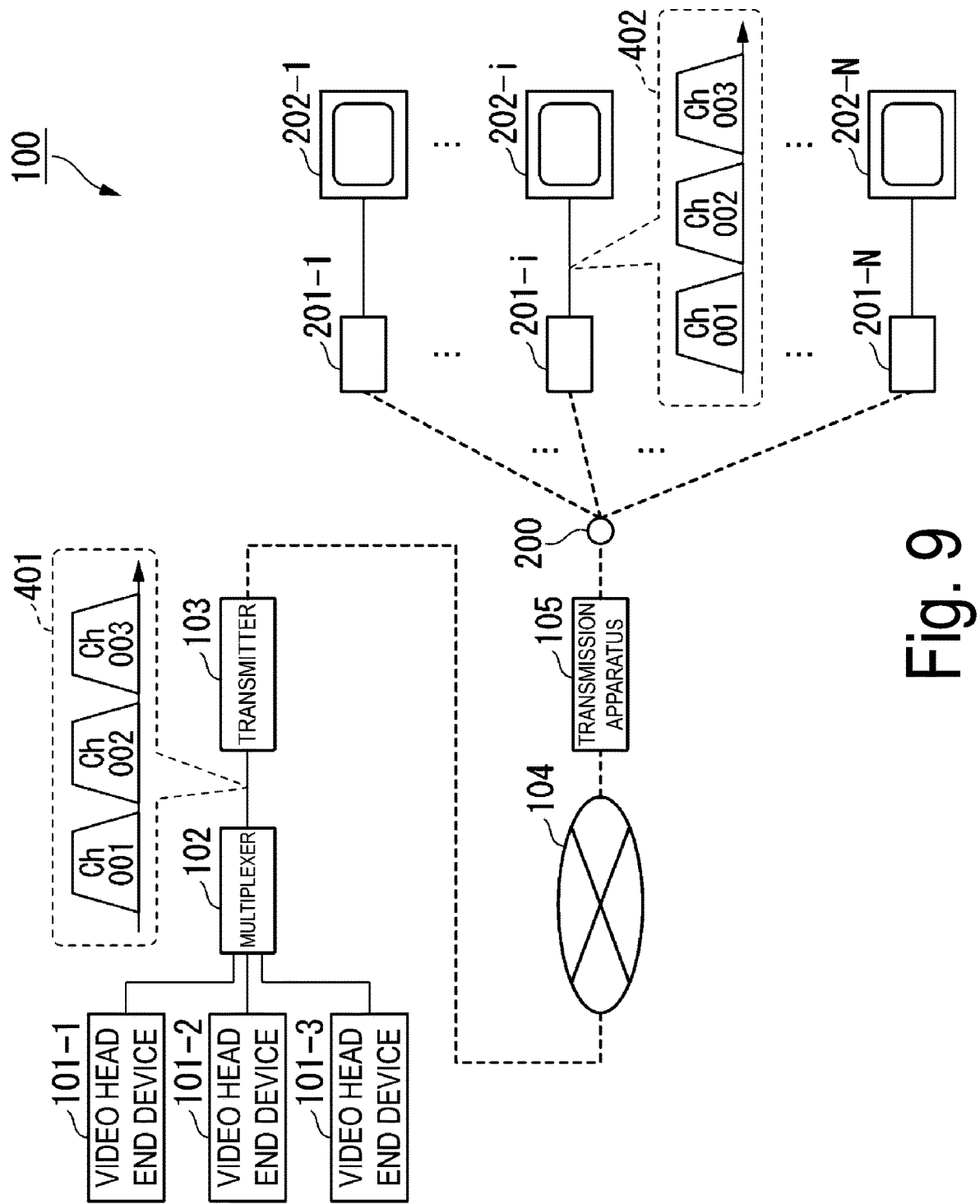
FIG. 9 is a block diagram of a communication system that transmits a frequency division multiplexed signal using an FM conversion scheme.
Figure 10:
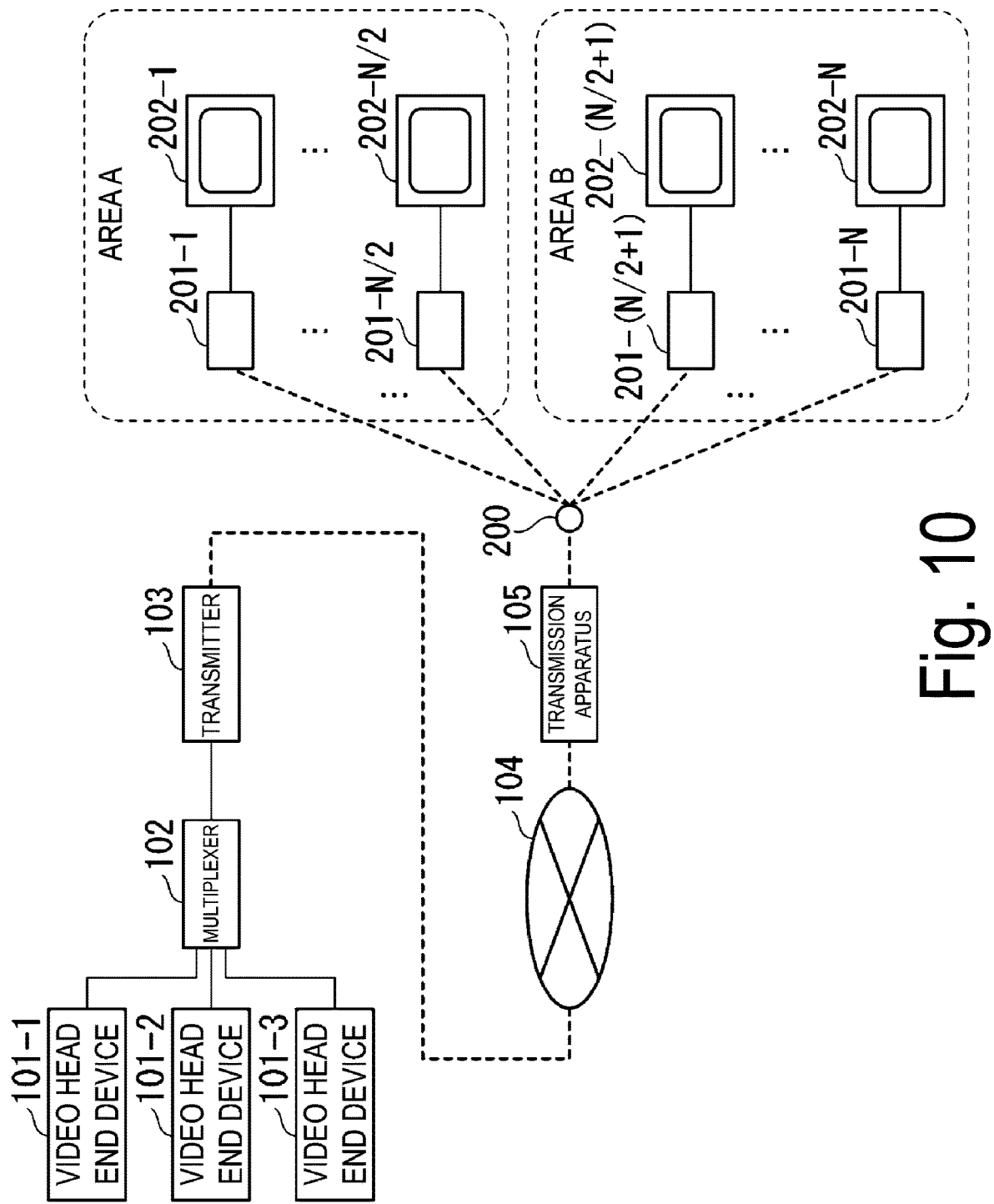
FIG. 10 is a diagram illustrating a configuration in which each of combinations of a plurality of communication network termination apparatuses and receivers is installed in each of different areas in the communication system illustrated in FIG. 9.

FIG. 8 is a block diagram illustrating a configuration of a communication system 1c according to a fourth embodiment. In the first embodiment, the control server apparatus 5 in transmitting the control signal uses the route for transmitting the video signal which is the main signal to transmit the control signal. In contrast, the second embodiment is different from the first embodiment in that the control server apparatus 5a in transmitting the control signal uses the route for transmitting the communication signal different from the route for transmitting the main signal to transmit the control signal.

The communication system 1c according to the fourth embodiment is the same as the communication system 1b according to the third embodiments in that the frequency division multiplexed signals are transmitted without being subjected to the FM conversion. However, as for the route for transmitting the control signal, the communication system 1c according to the fourth embodiment differs from the communication system 1b according to the third embodiment in that the communication system 1c uses the route for transmitting the communication signal different from the route for transmitting the main signal, similarly to the communication system 1a according to the second embodiment.

In FIG. 8, the same components as those of the first to third embodiments are denoted by the same reference signs and different components will be described below. The communication system 1c includes the frequency division multiplexed signal output apparatus 14, the transmitter 7b, the relay communication network 8, the transmission apparatus 9, the wavelength division multiplexing apparatus 13, the control communication network 11, the communication relay apparatus 12, the control server apparatus 5a, a communication network termination apparatus 2c, and the receiver 3. Note that in FIG. 8, a solid connection line indicates an electrical line connected by an electrical wiring line, and a dotted connection line indicates an optical line connected by an optical fiber, for example.

The communication network termination apparatus 2c includes a reception processing unit 20c, the filter unit 22, the electrical signal amplification unit 23, the multiplexing unit 24, the output control unit 25a, the storage unit 26, the disturbing signal generation unit 27, the disturbing signal amplification unit 28, and the communication signal processing unit 29. The reception processing unit 20c, which does not demodulate the signals subjected to the FM conversion unlike the reception processing unit 20a according to the second embodiment, includes the wavelength division multiplexing unit 33 and the optical-electric conversion unit 31, but no FM demodulation unit 32.

Then, the signal output by the optical-electric conversion unit 31 in the second embodiment is a wide band FM signal, whereas the signal output by the optical-electric conversion unit 31 in the fourth embodiment is the frequency division multiplexed signal including a plurality of video carrier signals as illustrated in a supplementary diagram denoted by a reference sign 49, because the transmitter 7b does not perform the FM conversion. In other words, the signal output by the optical-electric conversion unit 31 according to the fourth embodiment matches in form the signal output by the FM demodulation unit 32 according to the second embodiment. Note that in a graph of the supplementary diagram denoted by the reference sign 49, a horizontal axis represents a frequency and a vertical axis represents power.

However, in practice, by comparison of the scheme as in the fourth embodiment in which the frequency division multiplexed signal is subjected to the light intensity modulation and transmitted, and the scheme as in the second embodiment in which the frequency division multiplexed signal is subjected to the FM conversion and then subjected to the light intensity modulation, the scheme using the FM conversion is more improved in tolerance to noise or distortion in an optical transmission section.

As described above, because the signal output by the optical-electric conversion unit 31 according to the fourth embodiment matches in form the signal output by the FM demodulation unit 32 according to the second embodiment, the same processing as that performed in the communication system 1a according to the second embodiment is performed in the communication system 1c according to the fourth embodiment, except that the transmitter 7b does not perform the FM conversion and the reception processing unit 20c does not demodulate the FM signals.

For this reason, in the communication system 1c according to fourth embodiment, similarly to the communication system 1a according to the second embodiment, in the control server apparatuses 5a, the communication network termination apparatus 2c connecting to the receiver 3 to be requested to perform signal quality degradation for performing restriction of viewing can be designated, and further, the frequency band of the video carrier signal corresponding to the video to be requested to undergo signal quality degradation for performing restriction of viewing can be designated. The designated communication network termination apparatus 2c generates a disturbing signal in the designated frequency band so that the video carrier signal in the designated frequency band is degraded, and superimposes the generated disturbing signal on the frequency division multiplexed signals. This disables the receiver 3 connected to the communication network termination apparatus 2c from correctly demodulating the signal in the designated frequency band. Therefore, the restriction of the viewing of the video corresponding to the designated frequency band can be performed for the receiver 3 connected to the designated communication network termination apparatus 2c.

Accordingly, the communication system 1c has the same effect as the communication system 1 according to the second embodiment, and it is possible to restrict reproduction of a specific signal in the individual receiver 3 at the low cost and without the risk of the code being decrypted and invalidated, in the case of transmitting a plurality of signals using the frequency division multiplexing scheme through the relay communication network 8 that is the wired communication network.

Note that in the communication systems 1b and 1c according to the third and fourth embodiments described above, the frequency division multiplexed signal output apparatus 14 transmits the video carrier signal generated from the video signal, but may transmit a signal other than the video signal, for example, a carrier signal of an analog wave such as a voice signal of the radio. However, in such a case, adopted as the receiver 3 is not a television receiver but a radio receiver or the like. In the case that the frequency division multiplexed signal output apparatus 14 transmits the video signal, the video head end devices 4-1 to 4-3 according to the first and second embodiments may be adopted instead of the frequency division multiplexed signal output apparatus 14.

In the first to fourth embodiments described above, the relay communication network 8 is an optical communication network, but the relay communication network may be any communication network, or may be an electrical communication network, so long as it is a wired communication network.

In the first to fourth embodiments described above, the communication network termination apparatuses 2, 2a, 2b, and 2c may be configured to not include the filter unit 22.

In the first to fourth embodiments described above, the signal specifying data is the apparatus identifying data, but may be data including the frequency band specifying data, that is, the center frequency and the frequency bandwidth. In this case, the output control unit 25, 25a outputs the signal specifying data as is, as the frequency band specifying data, to the disturbing signal generation unit 27 rather than referring to the frequency band specifying table 261 to detect the frequency band specifying data corresponding to the signal specifying data. As such, the frequency band specifying table 261 has only the item "apparatus identifying data".

In the communication network termination apparatuses 2, 2a, 2b, and 2c in the first to fourth embodiments described above, for example, the disturbing signal generation unit 27 can be configured to be in a hardware configuration to make it difficult to analyze the disturbing signal superimposed on the video carrier signal. By doing so, the risk of the user analyzing the disturbing signal to view the video subjected to the restriction of viewing can be reduced.

In the first to fourth embodiments described above, the level of the disturbing signal is approximately 75% of the output level of the electrical signal amplification unit 23, which is merely an example, and this ratio is the ratio that is changed as appropriate depending on the content of the service provided. In a case that the disturbing signal generated by the disturbing signal generation unit 27 can be applied as is, the disturbing signal amplification unit 28 may not be included.

In the first to fourth embodiments described above, in a case that a plurality of video signals are subjected to restriction of viewing, the communication network termination apparatus 2, 2a, 2b, 2c is configured as below, for example. The communication network termination apparatus 2, 2a, 2b, 2c is provided with the disturbing signal generation units 27 and the disturbing signal amplification units 28 the numbers of both of which match the number of channels subjected to the restriction of viewing. Here, the plurality of disturbing signal generation units 27 are expressed as the disturbing signal generation units 27-1, 27-2, . . . , and the plurality of disturbing signal amplification units 28 are expressed as the disturbing signal amplification units 28-1, 28-2, . . . .

Each of the plurality of disturbing signal generation units 27-1, 27-2, and . . . is connected to the output control unit 25 in the case of the first and third embodiments, and is connected to the output control unit 25a in the case of the second and fourth embodiments. The plurality of disturbing signal amplification units 28-1, 28-2, . . . are connected to the corresponding disturbing signal generation units 27-1, 27-2, . . . , respectively, and the multiplexing unit 24. Note that, rather than directly connecting each of the plurality of disturbing signal amplification units 28-1, 28-2, and . . . to the multiplexing unit 24, a multiplexing unit that multiplexes outputs of the plurality of disturbing signal amplification units 28-1, 28-2, . . . may be provided to output the multiplexed amplified disturbing signals to the multiplexing unit 24.

In the case of the first and third embodiments, the control server apparatus 5 associates the apparatus identifying data designating the communication network termination apparatus 2, 2b connecting to the receiver 3 for performing the restriction of viewing with each of a plurality of signal specifying data pieces specifying a plurality of video carrier signals subjected to the restriction of viewing to generate the control signal. For example, in a case that the restriction of viewing of the videos corresponding to the channel identifying data "Ch002" and "Ch003" is performed for the communication network termination apparatus 2, 2b assigned with the apparatus identifying data "000002", the control signal includes two combinations "000002, Ch002" and "000002, Ch003".

In the case of the second and fourth embodiments, the control server apparatus 5a may, similarly to the form of the transmission by the server apparatus 5, transmit the control signal including a plurality of combinations obtained by associating the apparatus identifying data designating the communication network termination apparatus 2a, 2c connecting to the receiver 3 for performing the restriction of viewing with each of a plurality of signal specifying data pieces specifying a plurality of video carrier signals subjected to the restriction of viewing, or may, in a form different from the form of the transmission by the server apparatus 5, repeatedly transmit a plurality of control signals individually including each of the combinations, for example.

The output control unit 25, 25a reads out the frequency band specifying data including the center frequency "406 MHz" and the frequency bandwidth "7.5 MHz" from the frequency band specifying table 261 in accordance with the first combination "000002, Ch002" in the control signal, and outputs the read frequency band specifying data to the first disturbing signal generation unit 27-1. The output control unit 25 reads out the frequency band specifying data including the center frequency "414 MHz" and the frequency bandwidth "5.5 MHz" from the frequency band specifying table 261 in accordance with the second combination "000002, Ch003" in the restored control signal, and outputs the read frequency band specifying data to the second disturbing signal generation unit 27-2.

By doing so, the first disturbing signal generation unit 27-1 can generate a disturbing signal to be superimposed on the video carrier signal of the channel identifying data "Ch002", and the second disturbing signal generation unit 27-2 can generate a disturbing signal to be superimposed on the video carrier signal of the channel identifying data "Ch003".

For other receiver 3 assigned with the apparatus identifying data "000001" also, in a case that the restriction of viewing of the video signal corresponding to "Ch001", for example, the control server apparatus 5, 5a generates the control signal including three combinations "000001, Ch001," "000002, Ch002," and "000002, Ch003" and transmits the generated control signal. In this case, the restriction of viewing of the video of "Ch001" can be performed for the receiver 3 assigned with the apparatus identifying data "000001", and the restriction of viewing of the videos of "Ch002" and "Ch003" can be performed for the receiver 3 assigned with the apparatus identifying data "000002".

Rather than superimposing the disturbing signal on the signal in the frequency band to be subjected to the restriction of viewing as in the communication systems 1, 1a, 1b, and 1c in the first to fourth embodiments described above, the restriction of viewing can be performed in a configuration provided with a filter that removes the signal in the frequency band to be subjected to the restriction of viewing. However, in a case of using the filter, the filter can remove only a specific frequency band determined by the physical characteristic of the signal, so the filter may need to be changed per frequency band to be removed for application to a case that the frequency band to be removed varies depending on the service or addition or change is involved depending on the service. To remove a plurality of frequency bands, the signal needs to be passed through the filters the number of which is the number of frequency bands to be removed, which may cause phase delay or group delay. In contrast, as described above, the communication systems 1, 1a, 1b, and 1c according to the first to fourth embodiments need, in the case of performing the restriction of viewing on a plurality of video signals, to include the disturbing signal generation units 27-1, 27-2, . . . and disturbing signal amplification units 28-1, 28-2, . . . the numbers of both of which match the number of video signals subjected to the restriction of viewing. However, because each of the disturbing signal generation units 27-1, 27-2, and . . . can generate a signal in any frequency band, collectively multiplexing the respective signals on a main signal allows a one time multiplexing on the main signal, and thus, the phase delay or the group delay caused by the filter is not generated, suppressing the deterioration of the output signal. In other words, in the case of a plurality of disturbing signals, although a plurality of times of multiplexing need to be performed to generate one disturbing signal, multiplexing of the disturbing signal on the main signal is performed only one time. Therefore, the phase delay or the group delay is less likely to occur than passing through the filter many times.

The output control units 25 and 25a, and the storage unit 26 included in the communication network termination apparatuses 2, 2a, 2b, and 2c in the embodiments described above may be implemented by a computer. In this case, a program for implementing the functions may be recorded on a computer readable recording medium and the functions may then be implemented by causing a computer system to read and execute the program recorded on the recording medium. The "computer system" referred to herein includes an OS or hardware such as peripheral devices. The "computer readable recording medium" refers to a portable medium such as a flexible disk, a magneto-optical disc, a ROM, or a CD-ROM, a storage device such as a hard disk provided in the computer system, or the like. The "computer readable recording medium" may include something that dynamically holds a program for a short time, like a communication wire in the case in which the program is transmitted via a communication line such as a telephone line or a network such as the Internet, or may include something that holds a program for a certain period of time, like an internal volatile memory of a computer system that serves as a server or a client in that case. The program may be one for implementing some of the above-described functions or one which can implement the above-described functions in combination with a program already recorded in the computer system or may be one implemented using a programmable logic device such as a field programmable gate array (FPGA).

Although embodiments of the present invention have been described above in detail with reference to the drawings, the specific configurations thereof are not limited to those of the embodiments and also include designs or the like without departing from the spirit of the present invention.

INDUSTRIAL APPLICABILITY

The application can be made to a communication system that transmits a signal by wire using the frequency division multiplexing scheme.

REFERENCE SIGNS LIST

1 Communication system
2 Communication network termination apparatus
3 Receiver
4-1, 4-2, 4-3 Video head end device
5 Control server apparatus
6 Multiplexer
7 Transmitter
8 Relay communication network 9 Transmission apparatus
20 Reception processing unit
21 Demultiplexing unit
22 Filter unit
23 Electrical signal amplification unit
24 Multiplexing unit
25 Output control unit
26 Storage unit
27 Disturbing signal generation unit
28 Disturbing signal amplification unit

The invention claimed is:

1. A communication network termination apparatus comprising:
    a reception processor connected to a wired communication network, and configured to output a frequency division multiplexed signal obtained from a transmission signal transmitted over the wired communication network;
    an output controller configured to output, in a case that apparatus identifying data matches an apparatus identifying data stored in a storage of the communication network termination apparatus, a frequency band specifying data indicating a frequency band corresponding to signal specifying data, where the apparatus identifying data being for requesting signal quality degradation, and the signal specifying data being for specifying a carrier signal requesting signal quality degradation among a plurality of carrier signals included in the frequency division multiplexed signal;
    a disturbing signal generator configured to generate a disturbing signal in a frequency band corresponding to the frequency band specifying data output by the output controller; and
    a multiplexer configured to multiplex the frequency division multiplexed signal and the disturbing signal to output,
    the output controller, in a case that the apparatus identifying data the signal specifying data specifying each of the plurality of carrier signals included in the frequency division multiplexed signal and the frequency band specifying data in association with each other, and the apparatus identifying data acquired matches, refers to the storage to detect the frequency band specifying data corresponding to the signal specifying data, and outputs the detected frequency band specifying data,
    the output controller, in a case the signal specifying data is the frequency band specifying data and apparatus identifying data acquired matches the apparatus identifying data stored in a storage, outputs the signal specifying data as the frequency band specifying data.

2. The communication network termination apparatus according to claim 1, wherein
    the output controller acquires the signal specifying data included in the frequency division multiplexed signals and the apparatus identifying data, or acquires the signal specifying data included in another transmission signal received by the reception processor and the apparatus identifying data.

3. The communication network termination apparatus according to claim 1, wherein
    the transmission signal is the frequency division multiplexed signal or the frequency division multiplexed signals converted by FM conversion, and
    in a case that the transmission signal is the frequency division multiplexed signal converted by the FM conversion, and that the reception processor receives the transmission signal, the reception processor performs FM demodulation on the received transmission signal to restore the frequency division multiplexed signal, and outputs the restored frequency division multiplexed signal.

4. A non-transitory computer readable storage medium that stores a computer program to be executed by a computer of a communication network termination apparatus according to claim 1:
    outputting, in a case that apparatus identifying data matches an apparatus identifying data stored in a storage of the communication network termination apparatus, a frequency band specifying data indicating a frequency band corresponding to signal specifying data, the apparatus identifying data being for requesting signal quality degradation, and the signal specifying data being for specifying a carrier signal requesting signal quality degradation among a plurality of carrier signals included in the frequency division multiplexed signal.

5. A communication system comprising:
    a transmitter configured to send a transmission signal generated in accordance with a frequency division multiplexed signal to a wired communication network;
    a receiver configured to receive the frequency division multiplexed signal, and select and demodulate a carrier signal included in the frequency division multiplexed signal;
    a communication network termination apparatus connecting to the wired communication network and the receiver; and
    a control server apparatus configured to transmit apparatus identifying data and signal specifying data to the communication network termination apparatus, the apparatus identifying data specifying an apparatus to be requested to perform signal quality degradation, the signal specifying data specifying a signal requesting signal quality degradation among a plurality of carrier signals included in the frequency division multiplexed signal,
    wherein the communication network termination apparatus includes
    a reception processor configured to output the frequency division multiplexed signal obtained from the transmission signal transmitted over the wired communication network,
    an output controller configured to output, in a case that the apparatus identifying data transmitted by the control server apparatus matches an apparatus identifying data stored in a storage of the communication network termination apparatus, frequency band specifying data indicating a frequency band corresponding to the signal specifying data,
    a disturbing signal generator configured to generate a disturbing signal in a frequency band corresponding to the frequency band specifying data output by the output controller, and
    a multiplexer configured to multiplex the frequency division multiplexed signal and the disturbing signal to output,
    the output controller, in a case that the apparatus identifying data, the signal specifying data specifying each of the plurality of carrier signals included in the frequency division multiplexed signal and the frequency band specifying data in association with each other, and the apparatus identifying data acquired matches, refers to the storage to detect the frequency band specifying data corresponding to the signal specifying data, and outputs the detected frequency band specifying data, the output controller, in a case the signal specifying data is the frequency band specifying data and apparatus identifying data acquired matches the apparatus identifying data stored in the storage, outputs the signal specifying data as the frequency band specifying data.

6. A signal disturbing method comprising:

outputting a frequency division multiplexed signal obtained from a transmission signal transmitted over a wired communication network;

outputting, in a case that apparatus identifying data matches an apparatus identifying data stored in a storage of a communication network termination apparatus, a frequency band specifying data indicating a frequency band corresponding to signal specifying data, the apparatus identifying data being for requesting signal quality degradation, and the signal specifying data being for specifying a carrier signal requesting signal quality degradation among a plurality of carrier signals included in the frequency division multiplexed signal;

generating a disturbing signal in a frequency band corresponding to the frequency band specifying data output; and multiplexing the frequency division multiplexed signal and the disturbing signal to output, the outputting, in a case that the apparatus identifying data the signal specifying data specifying each of the plurality of carrier signals included in the frequency division multiplexed signal and the frequency band specifying data in association with each other, and the apparatus identifying data acquired matches, refers to the storage to detect the frequency band specifying data corresponding to the signal specifying data, and outputs the detected frequency band specifying data, the outputting, in a case the signal specifying data is the frequency band specifying data and apparatus identifying data acquired matches the apparatus identifying data stored in the storage, outputs the signal specifying data as the frequency band specifying data.

\* \* \* \* \*